(12) United States Patent
Wang

(10) Patent No.: US 12,188,350 B2
(45) Date of Patent: Jan. 7, 2025

(54) FLUORESCENT DYE OIL TRACER COMPOSITIONS

(71) Applicant: Saudi Arabian Oil Company, Dhahran (SA)

(72) Inventor: Wei Wang, Quincy, MA (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/835,676

(22) Filed: Jun. 8, 2022

(65) Prior Publication Data
US 2023/0399942 A1    Dec. 14, 2023

(51) Int. Cl.
| | |
|---|---|
| E21B 47/11 | (2012.01) |
| C09B 6/00 | (2006.01) |
| C09B 57/00 | (2006.01) |
| C09B 57/08 | (2006.01) |
| C09K 8/035 | (2006.01) |
| C09K 8/62 | (2006.01) |
| C09K 11/06 | (2006.01) |

(52) U.S. Cl.
CPC ............... *E21B 47/11* (2020.05); *C09B 6/00* (2013.01); *C09B 57/001* (2013.01); *C09B 57/08* (2013.01); *C09K 8/035* (2013.01); *C09K 8/62* (2013.01); *C09K 11/06* (2013.01); *C09K 2211/1011* (2013.01)

(58) Field of Classification Search
CPC ......... E21B 47/11; C09B 6/00; C09B 57/001; C09B 57/08; C09K 8/035; C09K 8/62; C09K 1/06; C09K 2211/1011

USPC .......................................................... 436/172
See application file for complete search history.

(56) References Cited

U.S. PATENT DOCUMENTS

| | | | | |
|---|---|---|---|---|
| 1,910,489 | A | * | 5/1933 | Lubs .................... C07D 277/82 548/161 |
| 2,033,949 | A | * | 3/1936 | Lubs .................... C07D 277/82 548/161 |
| 2,051,218 | A | * | 8/1936 | Magoun ................. C23G 1/065 528/242 |
| 2,061,243 | A | * | 11/1936 | Lubs .................... C07C 335/16 564/29 |
| 2,086,822 | A | * | 7/1937 | Schubert ............... C07C 335/16 546/171 |

(Continued)

FOREIGN PATENT DOCUMENTS

| | | |
|---|---|---|
| EP | 0171978 | 11/1990 |
| EP | 1721603 | 11/2006 |

(Continued)

OTHER PUBLICATIONS

French, H. E. et al, Journal of the American Chemical Society 1926, 48, 1736-1739. (Year: 1926).*

(Continued)

*Primary Examiner* — Arlen Soderquist
(74) *Attorney, Agent, or Firm* — Fish & Richardson P.C.

(57) ABSTRACT

A composition includes a functionalized fluorescent dye. The functionalized fluorescent dye includes an isothiocyanate-containing compound functionalized with a functional group. The functional group includes a primary amine. The functionalized fluorescent dye can be mixed with a fluid to form a tracer fluid for tracing fluid flow in a subterranean formation.

3 Claims, 12 Drawing Sheets

(56) References Cited

U.S. PATENT DOCUMENTS

| | | | | |
|---|---|---|---|---|
| 2,339,621 A * | 1/1944 | D Alelio | ................ | C08G 12/34 564/48 |
| 2,390,848 A * | 12/1945 | Richter | ................ | A01N 47/30 564/26 |
| 2,455,894 A * | 12/1948 | Lecher | ................ | C07C 323/44 546/186 |
| 2,479,498 A * | 8/1949 | Lecher | ................ | C07C 323/44 546/244 |
| 2,885,421 A * | 5/1959 | Spiegler | ................ | C07C 265/14 528/61 |
| 3,086,962 A * | 4/1963 | Hedrick | ................ | C08G 69/20 528/319 |
| 3,103,467 A * | 9/1963 | Beaver | ................ | C07C 335/16 424/73 |
| 3,238,176 A * | 3/1966 | Brooks | ................ | C08K 5/405 524/96 |
| 3,241,971 A * | 3/1966 | Kitze | ................ | G03C 1/49 430/599 |
| 3,281,446 A * | 10/1966 | Manning | ................ | C07C 265/14 564/26 |
| 3,287,136 A * | 11/1966 | McBride | ................ | G03C 1/49 430/592 |
| 3,301,895 A * | 1/1967 | Sayigh | ................ | C07C 267/00 564/252 |
| 3,637,785 A * | 1/1972 | Sayigh | ................ | B01J 31/2208 502/166 |
| 3,637,787 A * | 1/1972 | Rasschaert | ................ | C07C 331/28 558/322 |
| 3,654,214 A * | 4/1972 | Beckman | ................ | C08K 5/405 524/214 |
| 3,655,533 A * | 4/1972 | Page | ................ | C25D 3/22 205/314 |
| 3,953,506 A * | 4/1976 | Spicer | ................ | A01N 47/32 564/48 |
| 3,953,606 A * | 4/1976 | Spicer | ................ | C07D 213/40 514/585 |
| 4,148,799 A * | 4/1979 | Enders | ................ | C07D 277/42 548/197 |
| 4,461,821 A * | 7/1984 | Sano | ................ | G03G 5/0661 430/81 |
| 4,772,563 A | 9/1988 | Evangelista et al. | | |
| 4,921,939 A * | 5/1990 | Nofre | ................ | C07D 317/66 558/414 |
| 5,124,268 A | 6/1992 | Dakubu | | |
| 5,168,927 A | 12/1992 | Stegenneier | | |
| 5,498,502 A * | 3/1996 | Muramoto | ................ | G03G 5/0631 430/58.15 |
| 5,677,120 A * | 10/1997 | Lushington | ................ | G03C 1/09 430/603 |
| 6,250,848 B1 | 6/2001 | Moridis et al. | | |
| 6,331,436 B1 | 12/2001 | Richardson et al. | | |
| 6,590,647 B2 | 7/2003 | Stephenson | | |
| 6,691,780 B2 | 2/2004 | Nguyen et al. | | |
| 7,032,662 B2 | 4/2006 | Malone | | |
| 7,281,435 B2 | 10/2007 | Sale et al. | | |
| 7,485,471 B1 | 2/2009 | Sun et al. | | |
| 7,588,827 B2 | 9/2009 | Nie et al. | | |
| 7,861,601 B2 | 1/2011 | Sale et al. | | |
| 7,879,625 B1 | 2/2011 | Boss | | |
| 8,269,501 B2 | 9/2012 | Schmidt et al. | | |
| 8,337,783 B2 | 12/2012 | Locascio et al. | | |
| 8,627,902 B2 | 1/2014 | Hammer | | |
| 8,638,104 B2 | 1/2014 | Barber et al. | | |
| 8,877,954 B2 | 11/2014 | Giesenberg et al. | | |
| 9,034,920 B2 | 5/2015 | Lam et al. | | |
| 9,080,097 B2 | 7/2015 | Gupta et al. | | |
| 9,133,709 B2 | 9/2015 | Huh et al. | | |
| 9,322,056 B2 | 4/2016 | McCann et al. | | |
| 9,366,099 B2 | 6/2016 | Ly | | |
| 9,594,070 B2 | 3/2017 | Rule et al. | | |
| 10,273,399 B2 | 4/2019 | Cox | | |
| 10,308,865 B2 | 6/2019 | Cox | | |
| 10,308,895 B2 | 6/2019 | Vidal et al. | | |
| 10,400,159 B2 | 9/2019 | Gupta | | |
| 10,487,259 B2 | 11/2019 | Cox | | |
| 10,927,292 B2 | 2/2021 | Borrell et al. | | |
| 10,961,443 B2 | 3/2021 | Zhao | | |
| 10,961,445 B2 | 3/2021 | Ogle et al. | | |
| 2002/0161051 A1 * | 10/2002 | Chow | ................ | A61P 29/00 560/231 |
| 2003/0220204 A1 | 11/2003 | Baran et al. | | |
| 2004/0108110 A1 | 6/2004 | Zupanick et al. | | |
| 2005/0252286 A1 | 11/2005 | Ibrahim et al. | | |
| 2006/0052374 A1 * | 3/2006 | Carroll | ................ | C07D 491/04 514/253.09 |
| 2006/0105052 A1 | 5/2006 | Acar et al. | | |
| 2007/0114030 A1 | 5/2007 | Todd et al. | | |
| 2008/0110253 A1 | 5/2008 | Stephenson et al. | | |
| 2008/0111064 A1 | 5/2008 | Andrews et al. | | |
| 2009/0087911 A1 | 4/2009 | Rogerio | | |
| 2009/0087912 A1 | 4/2009 | Ramos et al. | | |
| 2009/0248309 A1 | 10/2009 | Nelville et al. | | |
| 2009/0277625 A1 | 11/2009 | Bai et al. | | |
| 2010/0049625 A1 | 2/2010 | Biebesheimer et al. | | |
| 2010/0092865 A1 | 4/2010 | Kanno et al. | | |
| 2010/0224823 A1 | 9/2010 | Yin et al. | | |
| 2010/0307745 A1 | 12/2010 | Lafitte et al. | | |
| 2011/0012331 A1 | 1/2011 | Kim | | |
| 2011/0030949 A1 | 2/2011 | Weaver et al. | | |
| 2011/0207231 A1 | 8/2011 | Natan et al. | | |
| 2011/0239754 A1 | 10/2011 | Dyer et al. | | |
| 2011/0257887 A1 | 10/2011 | Cooper et al. | | |
| 2011/0260051 A1 | 10/2011 | Preudhomme et al. | | |
| 2011/0275061 A1 | 11/2011 | Weidemaier et al. | | |
| 2012/0062886 A1 | 3/2012 | Piotti et al. | | |
| 2012/0115128 A1 | 5/2012 | Miller | | |
| 2012/0135080 A1 | 5/2012 | Bromberg et al. | | |
| 2012/0193578 A1 | 8/2012 | Pan et al. | | |
| 2012/0225274 A1 * | 9/2012 | Ishikawa | ................ | B29D 11/00788 428/220 |
| 2012/0257199 A1 | 10/2012 | Liu et al. | | |
| 2012/0261617 A1 | 10/2012 | Pan et al. | | |
| 2012/0325465 A1 | 12/2012 | Hammer et al. | | |
| 2013/0017610 A1 | 1/2013 | Roberts et al. | | |
| 2013/0040292 A1 | 2/2013 | Lopez et al. | | |
| 2013/0084643 A1 | 4/2013 | Commarieu et al. | | |
| 2013/0087329 A1 | 4/2013 | Hewitt et al. | | |
| 2013/0109261 A1 | 5/2013 | Koene | | |
| 2013/0244914 A1 | 9/2013 | Wu et al. | | |
| 2013/0259808 A1 | 10/2013 | Chen et al. | | |
| 2013/0296453 A1 | 11/2013 | Giesenberg et al. | | |
| 2013/0312970 A1 | 11/2013 | Lafitte et al. | | |
| 2013/0341030 A1 | 12/2013 | Brannon et al. | | |
| 2014/0060832 A1 | 3/2014 | Mahoney et al. | | |
| 2014/0077121 A1 | 3/2014 | Sun et al. | | |
| 2014/0120627 A1 | 5/2014 | Rubino et al. | | |
| 2014/0124196 A1 | 5/2014 | Sunde et al. | | |
| 2014/0186939 A1 | 7/2014 | Peterman et al. | | |
| 2014/0190700 A1 | 7/2014 | Tang et al. | | |
| 2014/0231077 A1 | 8/2014 | Rivero et al. | | |
| 2014/0260694 A1 | 9/2014 | Szlendak | | |
| 2014/0323363 A1 | 10/2014 | Perriat | | |
| 2014/0360973 A1 | 12/2014 | Yin et al. | | |
| 2015/0013983 A1 | 1/2015 | Alwattari | | |
| 2015/0038347 A1 | 2/2015 | Johnson et al. | | |
| 2015/0050741 A1 | 2/2015 | Tour et al. | | |
| 2015/0079270 A1 | 3/2015 | Wang et al. | | |
| 2015/0118501 A1 | 4/2015 | Lu | | |
| 2015/0132543 A1 | 5/2015 | Nouzille et al. | | |
| 2015/0159079 A1 | 6/2015 | Huh et al. | | |
| 2015/0218379 A1 | 8/2015 | Gee et al. | | |
| 2015/0232747 A1 | 8/2015 | Kanj et al. | | |
| 2015/0268370 A1 | 9/2015 | Johnston et al. | | |
| 2015/0368547 A1 | 12/2015 | Lesko et al. | | |
| 2015/0376493 A1 | 12/2015 | Huh et al. | | |
| 2016/0003040 A1 | 1/2016 | Jessheim et al. | | |
| 2016/0040514 A1 | 2/2016 | Rahmani et al. | | |
| 2016/0083641 A1 | 3/2016 | Gamage | | |
| 2016/0097750 A1 | 4/2016 | Van Herzen et al. | | |
| 2016/0215030 A1 | 7/2016 | Bressner | | |
| 2016/0264846 A1 | 9/2016 | Bennetzen et al. | | |
| 2016/0304934 A1 | 10/2016 | Matsuno | | |

(56) References Cited

U.S. PATENT DOCUMENTS

| | | |
|---|---|---|
| 2017/0022804 A1 | 1/2017 | Gupta et al. |
| 2017/0059668 A1 | 3/2017 | Chang et al. |
| 2017/0199124 A1 | 7/2017 | Bolduc et al. |
| 2017/0350236 A1 | 12/2017 | Shen et al. |
| 2017/0361376 A1 | 12/2017 | Murugesan et al. |
| 2018/0171782 A1 | 6/2018 | Cox et al. |
| 2018/0275114 A1 | 9/2018 | Kosynkin et al. |
| 2019/0118265 A1 | 4/2019 | Nie et al. |
| 2019/0218907 A1 | 7/2019 | Ow et al. |
| 2019/0226326 A1 | 7/2019 | Ow et al. |
| 2019/0368336 A1 | 12/2019 | Hammond et al. |
| 2019/0382648 A1 | 12/2019 | Murugesan et al. |
| 2021/0025858 A1 | 1/2021 | Ow et al. |
| 2023/0141596 A1* | 5/2023 | Wang ............ C09K 11/06 166/254.2 |
| 2023/0141819 A1* | 5/2023 | Wang ............ G01N 30/7206 436/27 |
| 2023/0144199 A1* | 5/2023 | Wang ............ C08F 12/08 166/250.12 |
| 2023/0182110 A1* | 6/2023 | Wang ............ B01J 20/103 436/27 |
| 2023/0183488 A1* | 6/2023 | Wang ............ C09B 11/24 436/27 |
| 2023/0183564 A1* | 6/2023 | Wang ............ C09K 8/62 166/250.12 |
| 2023/0183565 A1* | 6/2023 | Wang ............ G01N 21/643 436/500 |
| 2023/0235218 A1 | 7/2023 | Wang |

FOREIGN PATENT DOCUMENTS

| | | |
|---|---|---|
| EP | 2040075 | 3/2009 |
| EP | 2480625 | 4/2013 |
| EP | 2480626 | 4/2013 |
| GB | 2489714 | 10/2012 |
| JP | 2005524849 | 8/2005 |
| JP | 2007514169 | 5/2007 |
| JP | 2008505259 | 2/2008 |
| JP | 2008524602 | 7/2008 |
| JP | 2009535060 | 10/2009 |
| JP | 2009540326 | 11/2009 |
| JP | 2015523073 | 8/2015 |
| WO | WO 2010138914 | 12/2010 |
| WO | WO 2011035292 | 3/2011 |
| WO | WO 2011035294 | 3/2011 |
| WO | WO 2011063023 | 5/2011 |
| WO | WO 2012154332 | 11/2012 |
| WO | WO 2012158478 | 11/2012 |
| WO | WO 2013142869 | 9/2013 |
| WO | WO 2014014919 | 1/2014 |
| WO | WO 2014066793 | 5/2014 |
| WO | WO 2014096495 | 6/2014 |
| WO | WO 2014207075 | 12/2014 |
| WO | WO 2015044446 | 4/2015 |
| WO | WO 2015058206 | 4/2015 |
| WO | WO 2015097116 | 7/2015 |
| WO | WO 2015200060 | 12/2015 |
| WO | WO 2016087397 | 6/2016 |
| WO | WO 2017011328 | 1/2017 |
| WO | WO 2017136641 | 8/2017 |
| WO | WO 2017164822 | 9/2017 |
| WO | WO 2018085504 | 5/2018 |
| WO | WO 2018175763 | 9/2018 |
| WO | WO 2021092328 | 5/2021 |

OTHER PUBLICATIONS

Suter, C. M. et al, Journal of the American Chemical Society 1933, 55, 2497-2499. (Year: 1933).*
Sah, P. P. T., Journal of the Chinese Chemical Society 1934, 2, 225-228. (Year: 1934).*
Campbell, K. N. et al, Proceedings of the Indiana Academy of Science 1943, 53, 119-121. (Year: 1943).*
Dieke, S. H. et al, Journal of Pharmacology and Experimental Therapeutics 1947, 90, 260-270. (Year: 1947).*
Muller, G. W. et al, Journal of Medicinal Chemistry 1992, 35, 740-743. (Year: 1992).*
Nishizawa, S. et al, Analytical Sciences 1997, 13, supplement, 485-488. (Year: 1997).*
Xie, H. et al, Journal of the Chemical Society, Perkin Transactions 2 1999, 2751-2754. (Year: 1999).*
Li, J.-P et al, Synthetic Communications 2001, 31, 781-785. (Year: 2001).*
Gunnlaugsson, T. et al, Organic & Biomolecular Chemistry 2004, 2, 1856-1863. (Year: 2004).*
Kwon, J. Y. et al, Journal of Organic Chemistry 2004, 69, 5155-5157. (Year: 2004).*
Gomez, D. E. et al, Organic & Biomolecular Chemistry 2005, 3, 1495-1500. (Year: 2005).*
Cui, F.-L. et al, Analytica Chimica Acta 2006, 571, 175-183. (Year: 2006).*
dos Santos, C. M. G. et al, Tetrahedron Letters 2007, 48, 3135-3139. (Year: 2007).*
Ros-Lis, J. V. et al, European Journal of Organic Chemistry 2007, 2449-2458. (Year: 2007).*
dos Santos, C. M. G. et al, Supramolecular Chemistry 2008, 20, 407-418. (Year: 2008).*
Hacker, H.-G. et al, Journal of Medicinal Chemistry 2009, 52, 4586-45. (Year: 2009).*
Lin, W.-C. et al, Talanta 2010, 81, 1209-1215. (Year: 2010).*
Kinsella, M. et al, European Journal of Organic Chemistry 2011, 1125-1132. (Year: 2011).*
Ikedu, S. et al, The Journal of Physical Chemistry A 2011, 115, 8227-8233. (Year: 2011).*
Kim, S.-G. et al, ACS Combinatorial Science 2013, 15, 29-40. (Year: 2013).*
Amendola, V. et al, Journal of the American Chemical Society 2013, 135, 6345-6355. (Year: 2013).*
Berry, S. N. et al, Chemical Science 2016, 7, 5069-5077. (Year: 2016).*
Wu, D. et al, Medicinal Chemistry Research 2017, 26, 1388-1396. (Year: 2017).*
Byrne, S. et al, Supramolecular Chemistry 2018, 30, 196-205 (Year: 2018).*
Fesenko, A. A. et al, Tetrahedron 2020, 76, paper 131340, 18 pages. (Year: 2020).*
Rahman, F. U. et al, Molecules 2021, 26, paper 4506, 16 pages. (Year: 2021).*
Dyson, G. M. et al, Recueil des Travaux Chimiques des Pays-Bas 1926, 45, 421-423. (Year: 1926).*
Lindahl, R. et al, Journal of Chromatography 1993, 643, 35-41. (Year: 1993).*
Kumavat, P. P. et al, Environmental Chemistry Letters 2013, 11, 177-182. (Year: 2013).*
Busschaert, N. et al, Chemical Science 2013, 4, 3036-3045. (Year: 2013).*
Techapanalai, S., Chulalongkorn University Theses and Dissertations 2020, 160 pages. (Year: 2020).*
Janovec, L, et al, Collection of Czechoslovak Chemical Communications 2002, 67, 665-678. (Year: 2002).*
Jun, E. J. et al, Tetrahedron Letters 2006, 47, 3103-3106. (Year: 2006).*
Mi, L. et al, Journal of Biological CHemistry 2008, 283, 22136-22146. (Year: 2008).*
Luo, R. et al, Letters in Drug Design & Discovery 2013, 10, 640-650. (Year: 2013).*
Ahn, D.-R. et al, Bulletin of the Korean Chemical Society 2013, 34, 2861-2862. (Year: 2013).*
Dud, M. et al, Green Chemistry 2016, 18, 2666-2674. (Year: 2016).*
Mayr, F. et al, Journal of Organic Chemistry 2016, 81, 6965-6971 with 73 pages of supporting information. (Year: 2016).*
Bock, C. et al, ChemMedChem 2019, 14, 952-964 with 91 pages of supporting information. (Year: 2019).*

(56) References Cited

OTHER PUBLICATIONS

Aminofluorene NIST Chemistry WebBook, SRD 69, downloaded Jan. 2024 from https://webbook.nist.gov/cgi/inchi?ID=C6344634&Mask=200#. (Year: 2024).*

Fluorenamine NIST Chemistry WebBook, SRD 69, downloaded Jan. 2024 from https://webbook.nist.gov/cgi/cbook.cgi?Name=2-aminofluorene&Units=SI. (Year: 2024).*

Liu et al., "Self-Aggregating Deep Cavitand Acts as a Fluorescence Displacement Sensor for Lysine Methylation," J. Am. Chem. Soc., 2016, 138:10746-10749, 4 pages.

Kim et al. "Molecular Tripods Showing Fluorescence Enhancement upon Binding to Streptavidin," Org. Lett., 2005, 7(1):111-114, 14 pages.

Lin et al. "Toward live-cell imaging of dopamine neurotransmission with fluorescent neurotransmitter analogues," Chem. Commun., 2015, 51, 14080-14083, 35 pages.

Okuno et al., "Thermoresponsive Carbohydrate-b-Polypeptoid Polymer Vesicles with Selective Solute Permeability and Permeable Factors for Solutes," Biomacromolecules, Jun. 24, 2021, 22, 3099-3106, 20 pages.

Seydack et al., "trans-Stilbene Photochemistry Beyond 500 nm," Journal of Fluorescence, 2000, 10(3), 291-294, 4 pages.

U.S. Appl. No. 17/454,176, Wang et al., filed Nov. 9, 2021.
U.S. Appl. No. 17/454,181, Wang et al., filed Nov. 9, 2021.
U.S. Appl. No. 17/522,437, Wang et al., filed Nov. 9, 2021.
U.S. Appl. No. 17/522,445, Wang et al., filed Nov. 9, 2021.
U.S. Appl. No. 17/548,837, Wang, filed Dec. 13, 2021.
U.S. Appl. No. 17/548,858, Wang, filed Dec. 13, 2021.
U.S. Appl. No. 17/549,062, Wang, filed Dec. 13, 2021.
U.S. Appl. No. 17/643,931, Wang, filed Dec. 13, 2021.

Agenet et al., "SPE 157019: Fluorescent Nanobeads: a First Step Toward Intelligent Water Tracers" Society of Petroleum Engineers, SPE International Oilfield Nanotechnology conference, Jun. 12-14, 2012, 13 pages.

Alley et al., "Analysis of Polychlonnated Biphenyls in Fatty Biological Matrixes by On-Line Supercritical Fluid Extraction and Supercritical Fluid Cleanup." Journal of AOAC International 78.4, Jul. 1995, 1051-1054, 4 pages.

Anisimov, "SPE 118862: The Use of Tracers for Reservoir Characterization" Society of petroleum Engineers (SPE), presented at SPE Middle East Oil and Gas Show and Conference, Mar. 15-18, 2009, 8 pages.

Armelao et al., "Design of luminescent lanthanide complexes: From molecules to highly efficient photo-emitting materials" Coordination Chemistry Reviews, vol. 254, 5-6, Mar. 2010, 19 pages.

Aslan et al., "Fluorescent Core—Shell AG@SiO$_2$ Nanocomposites for Metal-Enhanced Fluorescence and Single Nanoparticle Sensing Platforms" Jan. 19, 2007, 2 pages.

Badgett et al., "Totalsynthese eines Neobetanidin-Derivates und des Neobetenamins" Helvetica Chimica Acta, 1970, 53(2): 433-448, 16 pages (English Abstract).

Bagaria et al., "Iron Oxide Nanoparticles Grafted with Sulfonated Copolymers are Stable in Concentrated Brine at Elevated Temperatures and Weakly Adsorb on Silica" ACS Applied Materials & Interfaces, vol. 5, No. 8, Mar. 25, 2013, 3329-3339, 11 pages.

Bala et al., "Interaction of Different Metal Ions with Carboxylic Acid Group: A Quantitative Study" The Journal of Physical Chemistry A, vol. 111, No. 28, Jun. 2007, 6183-6190, 8 pages.

Bao et al., "Luminescence properties of the co-luminescence groups of Sm-La-pyridyl carboxylic acids" Journal of Rare Earths, 30(4), Apr. 2012, 320-324, 5 pages.

Blachier et al., "Adsorption of polyamine on clay minerals" Journal of Colloid and Interface Science, 336, Aug. 2009, 599-606, 8 pages.

Borrini et al., "Water Soluble PDCA Derivatives for Selective Ln(III)/An(III) and Am(III)/Cm(III) Separation" Solvent Extraction and Ion Exchange, 33(3), Oct. 2014, 224-235, 30 pages.

Brichart et al., "The Use of Fluorescent Tracers for Inhibitor Concentration Monitoring Useful for Scale Inhibitor" International Petroleum Technology Conference, IPTC-17933-MS, presented at the International Petroleum Technology Conference held in Kuala Lumpur, Malaysia, Dec. 10-12, 2014, 8 pages.

Bunzil et al., "Taking advantage of luminescent lanthanide ions" Chemical Society Reviews, Dec. 2005, 29 pages.

Cao et al., "Solute reactive tracers for hydrogeological applications: A short review and future prospects." Water 12.3, Mar. 2020, 21 pages.

Chang et al., "Magnetic SERS Composite Nanoparticles for Microfluidic Detection" 251st ACE National Meeting, Mar. 13-17, 2016, 1 page, abstract.

Chemspider.com [online], "Structure Search" Mar. 2008, [retrieved on Feb. 15, 2022], retrieved from : URL <http://www.chemspider.com/structuresearch.aspx>, 1 page.

Chen et al., "Aggregation Kinetics of Alginate-Coated Hematite Nanoparticles in Monovalent and Divalent Electrolytes" Environmental Science & Technology, vol. 40, No. 5, Mar. 2006, 1516-1523, 9 pages.

Chen et al., "Analysis of the solution conformations of T4 lysozyme by paramagnetic NMR spectroscopy" Physical Chemistry Chemical Physics, 2016, 18(8), 5850-5859, 10 pages.

Chen et al., "Impact of Irreversible Retention on Tracer Deployments; Constraining Novel Material Deployments" SPE 188890-MS, in SPE Abu Dhabi International Petroleum Exhibition and Conference, Society of Petroleum Engineers, Nov. 2017, 8 pages.

Chen et al., "Improved Reservoir History Matching and Prudction Optimization with Tracer Data" SPE 191523-MS, in SPE Annual Technical Conference and Exhibition, Society of Petroleum Engineers, Sep. 2018, 15 pages.

Chen et al., "Upconversion Nanoparticles: Design, Nanochemistry, and Applications in Theranostics" Chem. Rev, 114(10), Mar. 2014, 5161-5214, 54 pages.

Chen et al., "FITC functionalized magnetic core-shell Fe$_3$O$_4$/Ag hybrid nanoparticle for selective determination of molecular biothiols" Elsevier Ltd., Dec. 2013, 7 pages.

Chen et al.; "Hydration Repulsion between Carbohydrate Surfaces Mediated by Temperature and Specific Ions" Scientific Reports, vol. 6, Jun. 23, 2016, 10 pages.

Cheraghian, "Application of nano-particles of clay to improve drilling fluid" Int. J. Nanosci. Nanotechnol., 13, Jun. 2017, 177-186, 10 pages.

Chuang et al., "Ultra-sensitive in-situ detection of novel near-infrared persistent luminescent tracer nanoagents in crude oil-water mixtures" a natureresearch journal, Scientific Reports, Jun. 15, 2016, 5 pages.

Coates et al., "Enhancement of luminescence of europium(m) ions in water by use of synergistic chelation. Part 1.1 : 1 and 2 : 1 complexes" J. Chem. Soc, Perkin Trans., Jan. 1996, 1275-1282, 8 pages.

Cole et al.; "Polyethylene Glycol Modified, Cross-Linked Starch-Coated Iron Oxide Nanoparticles for Enhanced Magnetic tumor Targeting" Biomaterials, vol. 32, No. 8, Mar. 1, 2011, 2183-2193, 11 pages.

Cox et al., "Pyrolyzable Nanoparticle Tracers for Environmental Interrogation and Monitoring" ACS Appl. Mater. Interfaces, 2017, 9(15), 13111-13120, 10 pages.

Cubillos et al., "SPE 174394-MS: The Value of Inter-well and Single Well Tracer Technology for De-Risking and Optimizing a CEOR Process—Caracara Field Case" Society of Petroleum Engineers (SPE), presented at Europec 2015, Jun. 1-4, 2015, 19 pages.

Das et al., "Molecular Fluorescence, Phosphorescence, and Chemiluminescence Spectrometry" Analytical Chemistry, Nov. 3, 2011, 29 pages.

Deans, "SPE 7076: Using Chemical Tracers To Measure Fractional Flow And Saturation In-Situ" Society of Petroleum Engineers (SPE), presented at SPE Symposium on improved Methods of Oil Recovery, Apr. 16-17, 1978, 10 pages.

Deschamps et al., "Drilling to the Extreme: the Micro-Coring Bit Concept" IADC/SPE 115187, presented at the IADC/SPE Asai Pacific Drilling Technology Conference and Exhibition, Aug. 25-27, 2008, 12 pages.

Desmette et al., "Drilling Hard and Abrasive Rock Efficiently, or Generating Quality Cuttings? You No Longer Have to

(56) References Cited

OTHER PUBLICATIONS

Choose . . . " SPE 116554, Society of Petroleum Engineers, 2008 SPE Annual Technical Conference and Exhibition, Sep. 21-24, 2008, 19 pages.

Du et al., "SPE 93140: Interwell Tracer Tests: Lessons Learnted from past Field Studies" Society of Petroleum Engineers (SPE), presented at SPE Asia Pacific Oil and Gas Conference and Exhibition, Apr. 5-7, 2005, 9 pages.

Dugstad, "Chapter 6: Well-to-well tracer tests" in Petroleum Engineering Handbook, 2007, 651-683, 31 pages.

Dung et al., "Structural and magnetic properties of starch coated magnetite nanoparticles" Journal of Experimental Nanoscience, 4, Sep. 2009, 259-267, 9 pages.

Edwards et al., "Extending the distance range accessed with continuous wave EPR with Gd3+ spin probes at high magnetic fields" Physical Chemistry Chemical Physics, 15(27), 2013, 11313-11326, 14 pages.

El-Aneed et al., "Mass Spectrometry, Review of the Basics: Electrospray, MALDI, and Commonly Used Mass Analyzers" Applied Spectroscopy Reviews, Mar. 16, 2009, 22 pages.

Fichtel et al., "A highly sensitive HPLC method for determination of nanomolar concentrations of dipicolinic acid, a characteristic constituent of bacterial endospores" Journal of Microbiological Methods, 2007, 70, 319-327, 9 pages.

Flury et al., "Dyes as tracers for vadose zone hydrology." Reviews of Geophysics 41.1, Mar. 2003, 37 pages.

Freeze and Cherry, "Chapter 9: Groundwater Contamination" in Groundwater, Englewood Cliffs, NJ: Prentice-Hall, Inc., 1979, 80 pages.

Galdiga and Greibrokk, "Ultra-trace determination of flurinated aromatic carboxylic acids in aqueous reservoir fluids using solid-phase extraction in combination with gas chromatography-mass spectrometry" Journal of Chromatography, vol. 793, Issue 2, Apr. 1997, 297-306, 10 pages.

Gao et al., "A Surface Functional Monomer-Directing Strategy for Highly Dense Imprinting of TNT at Surface of Silica Nanoparticles" Journal of American Chemical Society, vol. 129, No. 25, Jun. 2007, 7859-7866, 8 pages.

Gardiner et al., "Practical Raman Spectroscopy" Springer-Verlag, 1989, 9 pages.

Ge et al., "Fluorescence modified chitosan coated magnetic nanoparticles for high-efficienct cellular imaging" Nanoscale Res. Lett, 4, Jan. 2009, 287-295, 9 pages.

George et al., "Modified Dipicolinic Acid Ligands for Sensitation and Europium (III) Luminescence" Inorganic Chemistry, vol. 45, No. 4, Feb. 1, 2006, 6 pages.

Georgi, et al., "Advances in Cuttings Collection and Analysis" SPWLA 34th Annual Logging Symposium, Jun. 13-16, 1993, 20 pages.

Ghanem et al., "Investigation of Fluorescent Dyes as Partitioning Tracers for Subsurface Nonaqueous Phase Liquid (NAPL) Characterization," Journal of Enviornmental Engineering, Aug. 2003, 5 pages.

Gordon-Grossman et al., "W-Band pulse EPR distance measurements in peptides using Gd3+—dipicolinic acid derivatives as spin labels" Physical Chemistry Chemical Physics, 13(22), 2011, 10771-10780, 10 pages.

Grutzke et al., "Heptacoordinate Heteroleptic Salan (ONNO) and Thiosalan (OSSO) Titanium(IV) Complexes: Investigation of Stability and Cytotoxicity" Inorganic Chemistry 54(14), Jul. 2015, 6697-6706, 10 pages.

Hagoot, "The response of interwell tracer tests in watered-out reservoirs" SPE 11131-MS, in SPE Annual Technical Conference and Exhibition, Society of Petroleum Engineers, Jan. 1982, 21 pages.

Han et al., "Application of Silver-Coated Magnetic Microspheres to a SERS-Based Optofluidic Sensor" The Journal of Physical Chemistry (JPCC), Mar. 7, 2011, 7 pages.

Hardy et al., "A novel fluorescent tracer for real-time tracing of clay transport over soil surfaces" Catena, 141, Jun. 2016, 39-45, 7 pages.

He et al., "Luminescent Europium Chelates Synthesis and Fluorescence Properties" Sensors and Materials (2007), 19(2), 123-132, 10 pages.

Hindle et al., "Dipicolinic acid (DPA) assay revisited and appraised for spore detection" Analyst, 1999, 124: 1599-1604, 6 pages.

Hu et al., "Smart Liquid SERS Substrates based on $Fe_3O_4$/Au Nanoparticles with Reversibility Tunable Enhancement Factor for Practical Quantitative Detection" a natureresearch journal, Scientific Reports, Nov. 27, 2014, 10 pages.

Huseby et al., "Assessing EOR potential from partitioning tracer data" SPE 172808-MS, in SPE Middle East Oil and Gas Show and Conference, Society of Petroleum Engineers, Mar. 2015, 15 pages.

Huseby et al., "SPE-169183-MS: High Quality Flow Information from Tracer Data" Society of Petroleum Engineers (SPE), presented at the SPE Bergen One Day Seminar, Apr. 2, 2014, 9 pages.

Hutchins et al., "SPE-21049: Aqueous Tracers for Oilfield Applications" Society of Petroleum Engineers (SPE), presented at SPE International Symposium on Oilfield Chemistry, Feb. 20-22, 1991, 9 pages.

Invitrogen, "Fluorophores and Their Amine-Reactive Derivatives" Molecular Probs Handbook, A Guide to Fluorescent Probes and Labeling Technologies, 11th Edition, 2010, 88 pages.

Jenkins et al., "Ultratrace Determination of Selected Lanthanides by Luminescence Enhancement" Analytical Chemistry, vol. 68, No. 17, Jan. 1, 1996, 7 pages.

Jun et al., "Multifunctional Silver-Embedded Magnetic Nanoparticles as SERS Nanoprobes and Their Applications" Wiley-VCH Verlag GmbH& Co. KGaA, Weinheim, Jan. 4, 2010, 7 pages.

Kaushik et al., "Gd(III) and Mn(II) complexes for dynamic nuclear polarization: small molecular chelate polarizing agents and applications with site-directed spin labeling of proteins" Physical Chemistry Chemical Physics, 18(39), 2016, 27205-27218, 36 pages.

Khalil et al., "Organic dye for subsea flowline assessment." SPE International Symposium on Oilfield Chemistry. OnePetro, Feb. 1999, 7 pages.

Khan et al., "Optimizing waterflood management in a giant UAE carbonate oil field using simulation-based streamlines" SPE 171777-MS, in Abu Dhabi International Petroleum Exhibition and Conference, Society of Petroleum Engineers, Nov. 10-13, 2014, 9 pages.

Kneipp et al., "Single Molecule Detection Using Surface-Enhanced Raman Scattering (SERS)" Physical Review Letters, American Physical Society vol. 78, No. 9, Mar. 3, 1997, 4 pages.

Kornberger and Thiele, "Experiences with an Efficient Rate-Management Approach for the 8th Tortonian Reservoir in the Vienna Basin" SPE 166393-PA, SPE Reservoir Evaluation and Engineering, vol. 17, No. 2, May 2014, 12 pages.

Kosynkin and Alaskar, "Oil Industry First Interwell Trial of Reservoir Nanoagent Tracers" SPE 181551-MS, in SPE Annual Technical Conference and Exhibition, Society of Petroleum Engineers, Sep. 2016, 15 pages.

Kramer, "Water-Soluble Dendritic Architectures with Carbohydrate Shells for the Templation and Stabilization of Catalytically Active Metal Nanoparticles" published by ACS, Macromolecules, vol. 38, No. 20, Aug. 27, 2005, 8308-8315, 8 pages.

Labbe et al., "Development of metal-chelating inhibitors for the Class II fructose 1,6-bisphosphate (FBP) aldolase" Journal of Inorganic Biochemistry, 112, Jul. 2012, 49-58, 10 pages.

Lachowicz et al., "Biocompatible and fluorescent superparamagnetic iron oxide nanoparticles with superior magnetic properties coates with charged polysaccharide derivatives" Colloids and Surfaces B: Biointerfaces, 2017, 150, 402-407, 18 pages.

Larsen et al, "Efficient Synthesis of 4,7-Diamino Substituted 1,10-Phenanthroline-2,9-dicarboxamides" Organic Letters, vol. 13, No. 13, Jul. 2011, 3546-3548, 3 pages.

Li et al., "An amino-endcapped octadecylsilane silica-based mixed-mode stationary phase for the simultaneous separation of neutral and ionizable components in fixed-dose combinations." Analytical Methods 11.30, 2019, 3898-3909, 12 pages.

Li et al., "Long persistent phosphors—from fundamentals to applications" Chem. Soc. Rev., 45(8), Apr. 2016, 2090-2136, 48 pages.

Li et al., "Magic Angle Spinning NMR Structure Determination of Proteins from Pseudocontact Shifts" Journal of the American Chemical Society, 135(22), May 2013, 8294-8303, 10 pages.

(56) References Cited

OTHER PUBLICATIONS

Li et al., "Superparamagnetic Iron Oxide Nanoparticles as MRI contrast agents for Non-invasive Stem Cell Labeling and Tracking" Theranostics, Jul. 2013, 3(8):595-615, 21 pages.

Li et al., "Thiol-ene reaction: a versatile tool in site-specific labelling of proteins with chemically inert tags for paramagnetic NMR" Chemical Communications, Cambridge, United Kingdom, 48(21), 2704-2706, 2012, 18 pages.

Liu et al., "Photostimulated near-infrared persistent luminescence as a new optical read-out from Cr3+-doped LiGa5O8" Scientific Reports 3, Article 1554, Mar. 2013, 9 pages.

Liu et al., "Separation of polyethylene glycols and their fluorescein-labeled compounds depending on the hydrophobic interaction by high-performance liquid chromatography." Journal of Chromatography A 1129.1, Sep. 2006, 61-66, 6 pages.

Lomstein and Jorgensen, "Pre-column liquid chromatographic determination of dipicolinic acid from bacterial endospores" Limnology and Oceanography: Methods, Apr. 2012, 10:4, 227-233, 14 pages.

Mahdavi et al., "Preparation, Characterization, and Application of Polyacrylamide-Polystyrene/Bentonite Nanocomposite as an Effective Immobilizing Adsorbent for Remediation of Soil" Chemistry Select, 5, Apr. 2020, 4538-4547, 12 pages.

Mahmoudi et al., "Superparamagnetic iron oxide nanoparticles development surface modification and applications in chemotherapy" Advanced Drug Delivery Reviews, Jan. 2011, 63, 24-46, 23 pages.

Manna et al, "Complexation behavior of trivalent actinides and lanthanides with 1,10-phenanthroline-2,9-dicarboxylic acid based ligands: insight from density functional theory" Physical Chemistry Chemical Physics, vol. 14, No. 31, Jan. 2012, 11060-11069, 10 pages.

Marais, A., et al. "Time-Resolved Fluorescence for Real-Time Monitoring of Both Scale and Corrosion Inhibitors: A Game-Changing Technique" SPE International Oilfield Scale Conference and Exhibition. OnePetro, May 2016, 11 pages.

Marchetti et al., "Fluorous affinity chromatography for enrichment and determination of perfluoroalkyl substances" Annual Review of Analytical Chemistry vol. 84, Jul. 19, 2012, 8 pages.

Martinez et al., "Polysaccharide-based Nanoparticles for Controlled Release Formulations" The Delivery of Nanoparticles, Published May 2012, 185-222, 40 pages.

Martini et al., "How to Monitor Scale Inhibitor Squeeze using Simple TRF Tracers" Society of Petroleum Engineers, presented at the SPE International Symposium on Oilfield Chemistry held in the Woodlands, Texas, Apr. 13-15, 2015, 8 pages.

McWilliams et al., "Fluorescent surfactants from common dyes-rhodamine B and eosin Y." Pure and Applied Chemistry 92.2, Feb. 2020, 265-274, 15 pages.

Melton et al, "Complexes of Greatly Enhanced Thermodynamic Stability and Metal Ion Size-Based Selectivity, Formed by the Highly Preorganized Non-Macrocyclic Ligand 1,10-Phenanthroline-2,9-dicarboxylic Acid: A Thermodynamic and Crystallographic Study" Inorganic Chemistry vol. 45 No. 23, Jun. 2006, 9 pages.

Moyner et al., "The Application of Flow Diagnostics for Reservoir Management" Society of Petroleum Engineers (SPE), Apr. 2015, 18 pages.

Muller and Seubert, "Ultra trace determination of fluorobenzoic acids in tap and reservoir water using solid-phase extraction and gas chromatography-mass spectrometry" Journal of Chromatography A, 1260, Oct. 2012, 7 pages.

Nie et al., "Probing Single Molecules and Single Nanoparticles by Surface-Enhanced Raman Scattering" Science, vol. 275, No. 5303, Feb. 1997, 1102-1106, 6 pages.

Ogden et al, "Complexation of Am(III) and Nd(in) by 1,10-Phenanthroline-2,9-Di carboxylic Acid" Journal of Solution Chemistry, vol. 42, No. 1, pp. 211-225, 2013, 15 pages.

Ouali et al., "Analysis of Paramagnetic NMR Spectra of Triple-Helical Lanthanide Complexes with 2,6-Dipicolinic Acid Revisited: A New Assignment of Structural Changes and Crystal-Field Effects 25 Years Later" Inorganic Chemistry, 41(6), Feb. 2002, 1436-1445, 10 pages.

Pallenberg et al. "Synthesis and Characterization of Some Copper(I) Phenanthroline Complexes" Inorg. Chem. 1995, 34, 2833-2840, 8 pages.

Park et al., "Application of montmorillonite in bentonite as a pharmaceutical excipient in drug delivery systems" Journal of Pharmaceutical Investigation, 46, May 2016, 363-375, 13 pages.

Parker and Williams, "Getting excited about lanthanide complexation chemistry" Journal of the Chemical Society, Dalton Transactions, vol. 18, 1996, 16 pages.

Parker et al., "Being excited by lanthanide coordination complexes: aqua species, chirality, excited-state chemistry, and exchange dynamics" Chemical Reviews, vol. 102, Issue 6, May 2002, 34 pages.

Petoud et al., "Brilliant SM, Eu, Tb, and Dy Chiral Lanthanide Complexes with Strong Circularly Polarized Luminescence" Journal fo the American Chemical Society (JACS), Dec. 15, 2006, 7 pages.

Potapov et al., "Nanometer-Scale Distance Measurements in Proteins Using Gd3+ Spin Labeling" Journal of the American Chemical Society, 132(26), Jun. 2010, 9040-9048, 9 pages.

Qianming et al., "Bspda Synthesis and its Europium (III) Complexes' Fluorescence" Chemical Industry Times, Jul. 2005, 19(7): 38-41, 4 pages (English Abstract).

Rashdan et al., "Effect of the preparation route, PEG and annealing on the phase stability of Fe3O4 nanoparticles and their magnetic properties" Journal of Experimental Nanoscience, vol. 8, No. 2, 2013, 210-222, 13 pages.

Rovani, "Enhanced Oil Recovery: Aqueous Flow Tracer Measurement" WRI-09-R002, OSTI.Gov, Technical Report, U.S. Department of Energy, Feb. 2009, 1-18, 25 pages.

Rowan et al., "Dynamic Covalent Chemistry" Angewante Chemie International Edition, Mar. 15, 2002, 55 pages.

Sabbatini et al., "Luminescent lanthanide complexes as photochemical supramolecular devices" Coordination Chemistry Reviews, vol. 123, issue 1-2, Feb. 1993, 28 pages.

Saeki et al., "Upper and lower critical solution temperatures in poly (ethylene glycol) solutions" Polymer, vol. 17, No. 8, Aug. 1976, 685-689, 5 pages.

Sammes and Yshioglu, "Modern bioassays using metal chelates as luminescent probes" Natural Product Reports, vol. 31, No. 1, 1996, 28 pages.

Sanni et al., "A field case study of inter-well chemical tracer test" in SPE International Symposium on Oilfield Chemistry, Society of Petroleum Engineers, Apr. 2015, 17 pages.

Sanni et al., "Pushing the envelope of residual oil measurement: A field case study of a new class of inter-well chemical tracers" Journal of Petroleum Science and Engineering, vol. 163, 2018, 19 pages.

Santarelli et al., "Formation Evaluation From Logging on Cuttings" SPE Reservoir Evaluation and Engineering, presented at the 1996 SPE Permian Basin Oil and Gas Recovery Conference, Mar. 27-29, 1996, published Jun. 1998, 7 pages.

Schmidt et al., "Copper dipicolinates as peptidomimetic ligands for the Src SH2 domain" Bioorganic & Medicinal Chemistry Letters, 14(16), 4203-4206, Aug. 2004, 4 pages.

Schmidt et al., "Synthesis of Mono- and Dinuclear Vanadium Complexes and Their Reactivity toward Dehydroperoxidation of Alkyl Hydroperoxides" Inorganic Chemistry 56(3), 2017, 1319-1332, 14 pages.

Selvin et al., "Principles and biophysical applications of lanthanide-based probes" Annual Review of Biophysics and Biomolecular Structure, Jun. 2002, 28 pages.

Serres-Piole et al., "Direct sensitive simultaneous determination of fluorinated benzoic acids in oil reservoir waters by ultra high-performance liquid chromatography-tandem mass spectrometry" Journal of Chromatography A, 1218, Aug. 2011, 6 pages.

Serres-Piole et al., "Water tracers in oilfield applications: Guidelines" Elsevier Ltd., Journal of Science and Engineering, Nov. 2012, 18 pages.

(56) References Cited

OTHER PUBLICATIONS

ShamsiJazeyi et al., "Polymer-Coated Nanoparticles for Enhance Oil Recovery" Journal of Applied Polymer Science, vol. 131, No. 15, Aug. 5, 2014, 13 pages.

Shook et al., "SPE 124614: Determining Reservoir Properties and Flood Performance from Tracer Test Analysis" Society of petroleum Engineers (SPE), presented at SPE Annual Technical Conference and Exhibition, Oct. 4-7, 2009, 19 pages.

Silva et al., "Studies on new chemical tracers for determination of residual oil saturation in the inter-well region." SPE Oklahoma City Oil and Gas Symposium. OnePetro, Mar. 2017, 14 pages.

Solomon et al., "Synthesis and Study of Silver Nanoparticles" Journal of Chemical Education vol. 84, No. 2, 2007, 332-325, 4 pages.

Song et al., "SERS-Encoded Nanogapped Plasmonic Nanoparticles: Growth of Metallic Nanoshell by Templating Redox-Active Polymer Brushes" Journal of the American Chemical Society (JACS), Apr. 28, 2014, 4 pages.

Stiles et al., "Surface-Enhanced Raman Spectroscopy" Annual Review of Analytical Chemistry, vol. 1, No. 1, Jul. 2008, 601-626, 29 pages.

Stryer et al., "Diffusion-enhanced fluorescence energy transfer" Annual Review of Biophysics and bioengineering, vol. 11, Issue 1, 1982, 21 pages.

Su et al., "A Dipicolinic Acid Tag for Rigid Lanthanide Tagging of Proteins and Paramagnetic NMR Spectroscopy" Journal of the American Chemical Society, 130(32), Jul. 2008, 10486-10487, 2 pages.

Sýkora et al., "Recent advances in mixed-mode chromatographic stationary phases." Journal of separation science 42.1, Jan. 2019, 89-129, 75 pages.

Takenaka et al., "Effect of fatty acids on the membrane fluidity of cultured chick dorsal root ganglion measured by fluorescence photobleaching recovery." Journal of neurobiology 14.6, Nov. 1983, 457-461, 5 pages.

Tang et al., "Synthesis and fluorescence properties of Tb(III) complexes with pyridine-2,6-dicarboxylic acid derivatives" Journal of Central South University of Technology (English Edition), 15(5), Oct. 2008, 599-605, 7 pages.

Tang et al., "Synthesis of Novel Derivatives of Pyridine-2,6-dicarboxylic Acid" Synthetic Communications: An International Journal for Rapid Communication of Synthetic Organic Chemistry, 36(14), Jun. 2006, 2027-2034, 9 pages.

Tang et al., "Synthesis of Eu(III) and Tb(III) Complexes with Novel Pyridine-2,6-Dicarboxylic Acid Derivatives and Their Fluorescence Properties" Front. Chem. China, 2006, 4:, 408-413, 6 pages.

Thomas et al., "Deployment and Detection of a Novel Barcoded Advanced Tracers System for the Optimization of Improved Waterflood Recovery in Hydrocarbon Reservoirs" SPE-194872-MS, SPE Middle East Oil and Gas Show and Conference. Society of Petroleum Engineers, 2019, 10 pages.

Tian et al., "Off-Resonant Gold Superstructures as Ultrabright Minimally Invasive Surface-Enhanced Raman Scattering (SERS) Probes" American Chemical Society, Jul. 2015, 7 pages.

Toulhoat, "Experimentation and Modelling of U, Th and Lanthanides Transport in Fissured Rocks: Influence of Complexation" MRS Proceedings, vol. 50, Jan. 1, 1985, 8 pages.

Wahajuddin et al., "Superparamagnetic iron oxide nanoparticles: Magnetic nanoplatforms as drug carriers" International Journal of Nanomedicine, 7, Jul. 2012, 3445-3471, 27 pages.

Wang et al., "The Design and Implementation of a Full Field Inter-Well Tracer Program on a Giant UAE Carbonate Oil Field" in Abu Dhabi International Petroleum Exhibition and Conference, Society of Petroleum Engineers, SPE-177527-MS, Nov. 2015, 8 pages.

Wu et al., "A reusable biosensor chip for SERS-fluorescence dual mode immunoassay" Proc. SPIE 9543, Third International Symposium on Laser Interaction with Matter, 954317, May 4, 2015, 6 pages.

Wu et al., "A SERS-Assisted 3D Barcode Chip for High-Throughput Biosensing" Small Journal vol. 11, No. 23, Jun. 11, 2015, 9 pages.

Xu et al., "Superparamagnetic Photonic Crystals" Adv. Mater., Nov. 2001, 13, 1681-1683, 4 pages.

Xu et al., "Synthesis and Utilization of Monodisperse Superparamagnetic Colloidal Particles for Magnetically Controllable Photonic Crystals" Chem. Mater., 14(3), 2002, 1249-1256, 8 pages.

Xu et al.., "Measurement of two-photon excitation cross sections of molecular fluorophores with data from 690 to 1050 nm" Journal of the Optical Society of America B, Mar. 1996, 11 pages.

Yang et al., "The Co-Luminescence Groups of Sm-La-pyridyl Carboxylic Acids and the Binding Characteristics between the Selected Doped Complex and Bovine Serum Albumin" Bulletin of the Korean Chemical Society 33(4), Apr. 20, 2012, 1303-1309, 7 pages.

Yang et al., "Paramagnetic labeling of proteins and pseudocontact shift in structural biology" Chinese Journal of Magnetic Resonance, 2014, 31(2):155-171, 12 pages (English Abstract).

Yu et al., "Adsorption of proteins and nucleic acids on clay minerals and their interactions: A review" Applied Clay Science, 80-81, Aug. 2013, 443-452, 10 pages.

Zamberi et al., "SPE 166005: Improved Reservoir Surveillance Through Injected Tracers In A Saudi Arabian Field: Case Study" Society of Petroleum Engineers (SPE), presented at SPE Reservoir Characterization and Simulation Conference and Exhibition, Sep. 2013, 15 pages.

Zemel, "Chapter 3: Interwell Water Tracers" Tracers in the Oil Field, vol. 43, 1st Edition, Elsevier Science, Jan. 13, 1995, 47 pages.

Zhang et al., "Water adsorption on kaolinite and illite after polyamine adsorption" Journal of Petroleum Science and Engineering, 142, Jun. 2016, 13-20, 8 pages.

Zhao et al., "Chromatographic Separation of Highly Soluble Diamond Nanoparticles Prepared by Polyglycerol Grafting" Angewandte Chemie International Edition, vol. 50, No. 6, Feb. 7, 2011, 1388-1392, 5 pages.

Zheng et al., "Immobilization of Candida rugosa lipase on hydrophobic/strong cation-exchange functional silica particles for biocatalytic synthesis of phytosterol esters." Bioresource technology 115, Jul. 2012, 141-146, 6 pages.

Zhou et al., "Upconversion luminescent materials: advances and applications" Chem Rev., Jan. 14, 2015, 71 pages.

\* cited by examiner

FLUORESCENT DYE OIL TRACER COMPOSITIONS

TECHNICAL FIELD

This disclosure relates to methods and compositions used in generating and using functionalized fluorescent tracers with barcoded structures in drilling and oil well applications.

BACKGROUND

Tracer techniques can be a powerful diagnostic tool in numerous scientific disciplines and for technologies in many industrial sectors. Molecular tracers can include water-soluble or oil-soluble compounds. In field tests of oilfields, water-soluble tracers can provide a better understanding of the studied oil reservoir, for example, a better understanding of inter-well connections, connections between layers and heterogeneities. Similarly, oil-soluble tracers can provide information on petroleum products, for example qualitative analysis of the production fluid return from multiple stage completions, either vertical or horizontal completions.

SUMMARY

This disclosure describes technologies relating to functionalized fluorescent tracers with barcoded structures, methods of making the tracers, and methods of using the tracers. Certain aspects of the subject matter described can be implemented as a composition. The composition includes a functionalized fluorescent dye. The functionalized fluorescent dye includes an isothiocyanate-containing compound functionalized with a functional group. The functional group includes a primary amine. The isothiocyanate-containing compound is selected from the group consisting of methyl isothiocyanate, ethyl isothiocyanate, propyl isothiocyanate, isopropyl isothiocyanate, butyl isothiocyanate, tert-butyl isothiocyanate, hexyl isothiocyanate, octyl isothiocyanate, decyl isothiocyanate, dodecyl isothiocyanate, tetradecyl isothiocyanate, hexadecyl isothiocyanate, octadecyl isothiocyanate, phenyl isothiocyanate, benzyl isothiocyanate, phenylethyl isothiocyanate, cyclohexyl isothiocyanate, cyclohexylmethyl isothiocyanate, 2-piperidinoethyl isothiocyanate, p-tolyl isothiocyanate, 2,6-dimethylphenyl isothiocyanate, 4-ethylphenyl isothiocyanate, 4-methoxyphenyl isothiocyanate, 2,4-dimethoxyphenyl isothiocyanate, 4-chlorophenyl isothiocyanate, 2,6-dichlorophenyl isothiocyanate, 2,4,5-trichlorophenyl isothiocyanate, 3-bromophenyl isothiocyanate, 2,5-dibromophenyl isothiocyanate, 2,4,6-tribromophenyl isothiocyanate, 3-fluorophenyl isothiocyanate, 2,6-difluorophenyl isothiocyanate, 2,4,6-trifluorophenyl isothiocyanate, 4-(trifluoromethyl)phenyl isothiocyanate, 3,5-bis(trifluoromethyl)phenyl isothiocyanate, 2-chloro-5-(trifluoromethyl)phenyl isothiocyanate, 4-bromo-2-(trifluoromethyl)phenyl isothiocyanate, 4-fluoro-3-(trifluoromethyl)phenyl isothiocyanate, 3-chloro-4-fluorophenyl isothiocyanate, 2-bromo-4-fluorophenyl isothiocyanate, or 4-bromo-2-chlorophenyl isothiocyanate, or any isoform thereof. The functional group is selected from the group consisting of 1-naphthylamine, 2-aminoanthracene, 1-aminopyrene, 6-chrysenamine, 9-aminophenanthrene, 2-aminofluorene, 9-aminoacridine, 1,10-phenanthrolin-5-amine, 9H-carbazol-2-amine, or 3-amino-9-ethylcarbazole.

This, and other aspects, can include one or more of the following features. The isothiocyanate-containing compound can be cyclohexylmethyl isothiocyanate, and the functional group can be 1-naphthylamine. The isothiocyanate-containing compound can be 2,6-difluorophenyl isothiocyanate, and the functional group can be 2-aminoanthracene. The isothiocyanate-containing compound can be 4-ethylphenyl isothiocyanate, and the functional group can be 1-aminopyrene. The isothiocyanate-containing compound can be hexyl isothiocyanate, and the functional group can be 6-chyrsenamine. The isothiocyanate-containing compound can be butyl isothiocyanate, and the functional group can be 9-aminophenanthrene. The isothiocyanate-containing compound can be ethyl isothiocyanate, and the functional group can be 1-aminofluorene. The isothiocyanate-containing compound can be decyl isothiocyanate, and the functional group can be 9-aminoacridine. The isothiocyanate-containing compound can be benzyl isothiocyanate, and the functional group can be 1,10-phenanthrolin-5-amine. The isothiocyanate-containing compound can be p-tolyl isothiocyanate, and the functional group can be 3-amino-9-ethylcarbazole.

Certain aspects of the subject matter described can be implemented as a method of making a functionalized fluorescent dye. The method includes dissolving an oil-soluble isothiocyanate-containing compound in a first portion of a first organic solvent to yield a first solution. The oil-soluble isothiocyanate-containing compound is selected from the group consisting of methyl isothiocyanate, ethyl isothiocyanate, propyl isothiocyanate, isopropyl isothiocyanate, butyl isothiocyanate, tert-butyl isothiocyanate, hexyl isothiocyanate, octyl isothiocyanate, decyl isothiocyanate, dodecyl isothiocyanate, tetradecyl isothiocyanate, hexadecyl isothiocyanate, octadecyl isothiocyanate, phenyl isothiocyanate, benzyl isothiocyanate, phenylethyl isothiocyanate, cyclohexyl isothiocyanate, cyclohexylmethyl isothiocyanate, 2-piperidinoethyl isothiocyanate, p-tolyl isothiocyanate, 2,6-dimethylphenyl isothiocyanate, 4-ethylphenyl isothiocyanate, 4-methoxyphenyl isothiocyanate, 2,4-dimethoxyphenyl isothiocyanate, 4-chlorophenyl isothiocyanate, 2,6-dichlorophenyl isothiocyanate, 2,4,5-trichlorophenyl isothiocyanate, 3-bromophenyl isothiocyanate, 2,5-dibromophenyl isothiocyanate, 2,4,6-tribromophenyl isothiocyanate, 3-fluorophenyl isothiocyanate, 2,6-difluorophenyl isothiocyanate, 2,4,6-trifluorophenyl isothiocyanate, 4-(trifluoromethyl)phenyl isothiocyanate, 3,5-bis(trifluoromethyl)phenyl isothiocyanate, 2-chloro-5-(trifluoromethyl)phenyl isothiocyanate, 4-bromo-2-(trifluoromethyl)phenyl isothiocyanate, 4-fluoro-3-(trifluoromethyl)phenyl isothiocyanate, 3-chloro-4-fluorophenyl isothiocyanate, 2-bromo-4-fluorophenyl isothiocyanate, or 4-bromo-2-chlorophenyl isothiocyanate, or any isoform thereof. The method includes dissolving a functional group in a second portion of the first organic solvent to yield a second solution. The functional group includes a primary amine and is selected from the group consisting of 1-naphthylamine, 2-aminoanthracene, 1-aminopyrene, 6-chrysenamine, 9-aminophenanthrene, 2-aminofluorene, 9-aminoacridine, 1,10-phenanthrolin-5-amine, 9H-carbazol-2-amine, or 3-amino-9-ethylcarbazole. The method includes mixing the first solution and the second solution to form a reaction mixture. The method includes extracting the functionalized fluorescent dye from the reaction mixture. The functionalized fluorescent dye is a reaction product of the oil-soluble isothiocyanate-containing compound and the functional group.

This, and other aspects, can include one or more of the following features. The first organic solvent can include methanol, ethanol, propanol, isopropanol, chloroform, dichloromethane, acetone, cyclohexane, hexane, benzene, toluene or any combination thereof. Extracting the functionalized fluorescent dye from the reaction mixture can include evaporating the first organic solvent. The method can include re-dispersing the functionalized fluorescent dye in a second organic solvent after extracting the functionalized fluorescent dye from the reaction mixture. The second organic solvent can include crude oil, diesel, mineral oil, food oil, methanol, ethanol, propanol, isopropanol, butanol, pentanol, hexanol, heptanol, octenol, acetone, ethyl acetate, acetonitrile, chloroform, hexane, heptane, cyclohexane, benzene, toluene, tetrahydrofuran, or any combination thereof. The second organic solvent can have a composition different from the composition of the first organic solvent.

Certain aspects of the subject matter described can be implemented as a method of tracing fluid flow in a subterranean formation. The method includes mixing a functionalized fluorescent tracer and a fluid to form a tracer fluid. The functionalized fluorescent tracer includes an isothiocyanate-containing compound functionalized with a functional group. The functional group includes a primary amine. The isothiocyanate-containing compound is selected from the group consisting of methyl isothiocyanate, ethyl isothiocyanate, propyl isothiocyanate, isopropyl isothiocyanate, butyl isothiocyanate, tert-butyl isothiocyanate, hexyl isothiocyanate, octyl isothiocyanate, decyl isothiocyanate, dodectyl isothiocyanate, tetradecyl isothiocyanate, hexadecyl isothiocyanate, octadecyl isothiocyanate, phenyl isothiocyanate, benzyl isothiocyanate, phenylethyl isothiocyanate, cyclohexyl isothiocyanate, cyclohexylmethyl isothiocyanate, 2-piperidinoethyl isothiocyanate, p-tolyl isothiocyanate, 2,6-dimethylphenyl isothiocyanate, 4-ethylphenyl isothiocyanate, 4-methoxyphenyl isothiocyanate, 2,4-dimethoxyphenyl isothiocyanate, 4-chlorophenyl isothiocyanate, 2,6-dichlorophenyl isothiocyanate, 2,4,5-trichlorophenyl isothiocyanate, 3-bromophenyl isothiocyanate, 2,5-dibromophenyl isothiocyanate, 2,4,6-tribromophenyl isothiocyanate, 3-fluorophenyl isothiocyanate, 2,6-difluorophenyl isothiocyanate, 2,4,6-trifluorophenyl isothiocyanate, 4-(trifluoromethyl)phenyl isothiocyanate, 3,5-bis(trifluoromethyl)phenyl isothiocyanate, 2-chloro-5-(trifluoromethyl)phenyl isothiocyanate, 4-bromo-2-(trifluoromethyl)phenyl isothiocyanate, 4-fluoro-3-(trifluoromethyl)phenyl isothiocyanate, 3-chloro-4-fluorophenyl isothiocyanate, 2-bromo-4-fluorophenyl isothiocyanate, or 4-bromo-2-chlorophenyl isothiocyanate, or any isoform thereof. The functional group is selected from the group consisting of 1-naphthylamine, 2-aminoanthracene, 1-aminopyrene, 6-chrysenamine, 9-aminophenanthrene, 2-aminofluorene, 9-aminoacridine, 1,10-phenanthrolin-5-amine, 9H-carbazol-2-amine, or 3-amino-9-ethylcarbazole. The method includes flowing the tracer fluid into a first subterranean formation. The method includes recovering a sample from the first subterranean formation or a second subterranean formation connected to the first subterranean formation. The method includes analyzing the sample for a fluorescent signal.

This, and other aspects, can include one or more of the following features. The method can include identifying the functionalized fluorescent tracer in the sample using fluorescence, ultraviolet-visible (UV-Vis) spectroscopy, Fourier-transform infrared spectroscopy (FTIR), Raman spectroscopy, mass spectroscopy (MS), high performance liquid chromatography (HPLC), or liquid chromatography-mass spectroscopy (LC-MS), or any combination thereof. The sample can be a fluid sample. The sample can be a solid sample. The fluid can be a fracking fluid. The fluid can be a drilling mud. The method can include analyzing the sample for a barcode structure. The method can include identifying the isothiocyanate-containing compound of the functionalized fluorescent tracer based on the barcode structure.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes functionalized fluorescent tracers, methods of making the tracers, and methods of using the tracers. The functionalized fluorescent tracers can be used, for example, to track hydrocarbons in wells. A chemical method can be implemented to modify the structures of conventional fluorescent dye molecules by covalently bonding an aromatic compound to the dye molecule, which can increase the fluorescent dye's hydrophobicity. The resulting dye is oil-soluble while retaining its fluorescence. The aromatic compound can also serve as a molecular identifier.

Figure 1:
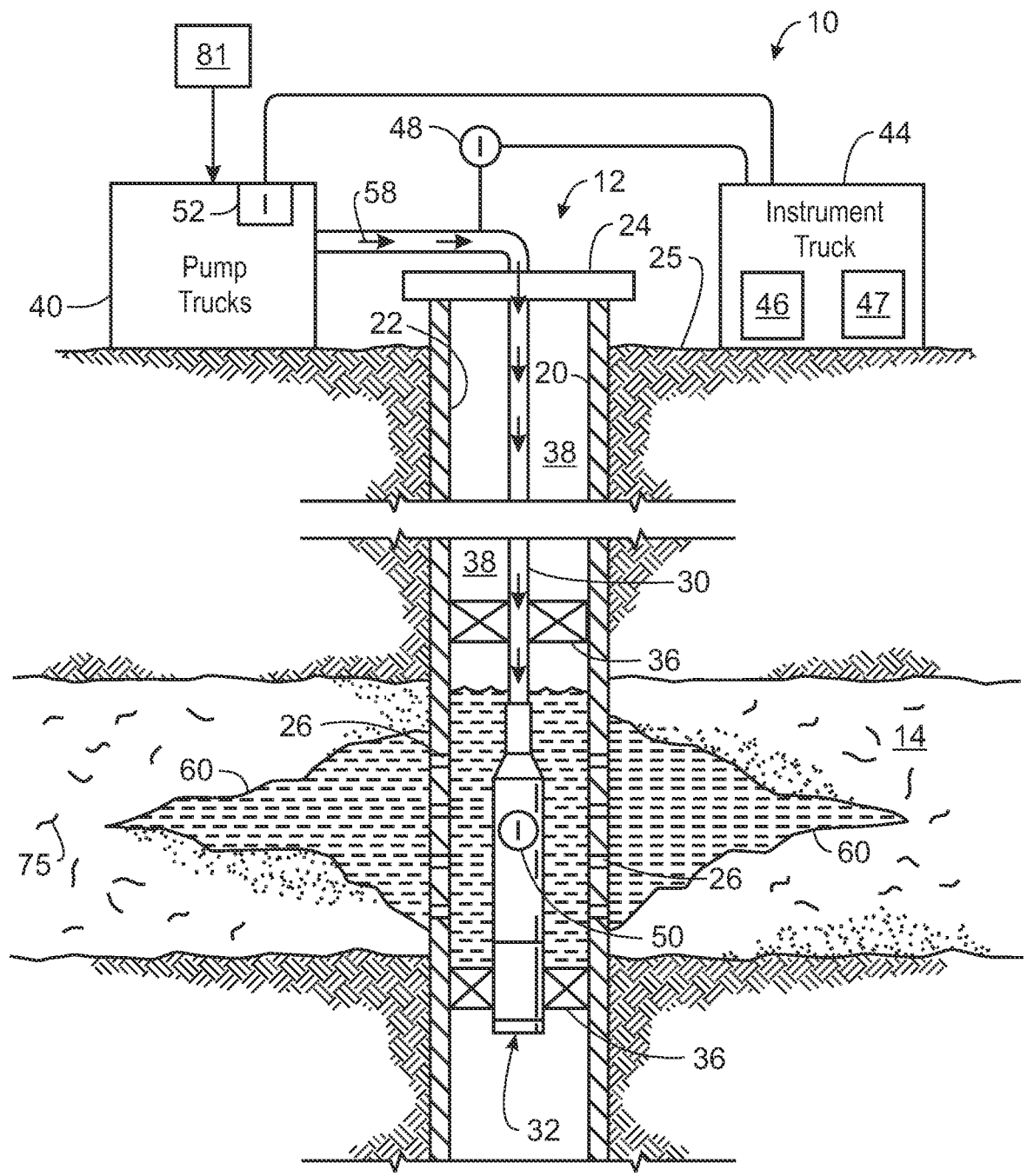
FIG. 1 is a schematic diagram of an example well.

FIG. 1 depicts an example of a drilling operation 10 for a well 12. The well 12 can be in a wellbore 20 formed in a subterranean zone 14 of a geological formation in the Earth's crust. The well 12 enables access to the subterranean zone 14 to allow recovery (that is, production) of fluids to the surface and, in some implementations, additionally or alternatively allows fluids to be placed in the Earth. The subterranean zone 14 can include, for example, a formation, a portion of a formation, or multiple formations in a hydrocarbon-bearing reservoir from which recovery operations can be practiced to recover trapped hydrocarbons. Examples of unconventional reservoirs include tight-gas sands, gas and oil shales, coalbed methane, heavy oil and tar sands, gas-hydrate deposits, to name a few. In some implementations, the subterranean zone 14 includes an underground formation including natural fractures 60 in rock formations containing hydrocarbons (for example, oil, gas, or both). For example, the subterranean zone 14 can include a fractured shale. In some implementations, the well 12 can intersect other suitable types of formations, including reservoirs that are not naturally fractured.

The well 12 can include a casing 22 and well head 24. The wellbore 20 can be a vertical, horizontal, deviated, or multilateral bore. The casing 22 can be cemented or otherwise suitably secured in the wellbore 20. Perforations 26 can be formed in the casing 22 at the level of the subterranean zone 14 to allow oil, gas, and by-products to flow into the well 12 and be produced to the surface 25. Perforations 26 can be formed using shape charges, a perforating gun, or otherwise.

For a drilling treatment 10, a work string 30 can be disposed in the wellbore 20. The work string 30 can be coiled tubing, sectioned pipe, or other suitable tubing. A drilling tool or drill bit 32 can be coupled to an end of the work string 30. Packers 36 can seal an annulus 38 of the wellbore 20 uphole of and downhole of the subterranean zone 14. Packers 36 can be mechanical, fluid inflatable, or other suitable packers.

One or more pump trucks 40 can be coupled to the work string 30 at the surface 25. The pump trucks 40 pump drilling mud 58 down the work string 30 to lubricate and cool the drilling tool or drill bit 32, maintain hydrostatic pressure in the wellbore, and carry subterranean cuttings to the surface. The drilling mud 58 can include a fluid pad, proppants, flush fluid, or a combination of these components. The pump trucks 40 can include mobile vehicles, equipment such as skids, or other suitable structures.

One or more instrument trucks 44 can also be provided at the surface 25. The instrument truck 44 can include a drilling control system 46 and a drilling simulator 47. The drilling control system 46 monitors and controls the drilling treatment 10. The drilling control system 46 can control the pump trucks 40 and fluid valves to stop and start the drilling treatment 10. The drilling control system 46 communicates with surface and subsurface instruments to monitor and control the drilling treatment 10. In some implementations, the surface and subsurface instruments may comprise surface sensors 48, down-hole sensors 50, and pump controls 52.

Additives 81 can be mixed with drilling mud 58 or other drilling fluids and flowed through the reservoir. In some implementations, the additives 81 can include one or more tracers, for example, a fluorescent dye. Fluorescent dyes can be used as oil-soluble tracers. These dyes are inexpensive and easy to use. Examples of fluorescent dyes include fluorescein, eosin, Rhodamine, and Rhodamine-B. However, these organic dye-based tracers have some shortcomings as oil-soluble tracers. For example, the water-soluble tracers fluorescein, eosin, and Rhodamine can adsorb onto reservoir rock or partition with the oil phase. In oil, these tracers have poor solubility due to their high hydrophilicity, although the molecules may partially dissolve in the oil phase. In addition, the number of tracers is limited to the number of organic dye molecules available.

The tracers described herein overcome these shortcomings. These tracers can be generated using a synthetic method to chemically modify the molecular structure of a dye. For example, by covalently grafting functional groups onto the dye molecules, the various functional groups can create barcoded structural information, resulting in new compounds. In some embodiments, by introducing hydrophobic functional groups (for example, an aromatic functional group), the hydrophobicity of the resulting molecules can be enhanced, thus improving their solubility in an oil phase. By tailoring the molecules, the hydrophobicity of the molecule can be adjusted to a desired degree. Therefore, the partition of the molecule in an oil phase is controllable. This, in part, enables the potential application of these functionalized fluorescent dyes as partition tracers for oil reservoir applications. The structure-modified dyes reserve their fluorescence properties, although in some implementations the fluorescence features may also be modified by the introduction of functional groups.

These functionalized fluorescent dyes are described herein as barcoded or having barcode information. In this context, "barcode" refers to the fact that these functionalized dyes or tracers are uniquely identifiable two or more orthogonal analyses. As a first factor, the tracers can be identified by their fluorescence signal, for example, by the wavelength of the emission spectrum or simply by the presence of a fluorescent signal. As a second factor, the tracers can be identified by their mass or hydrophobicity. Accordingly, the unique combinations of the different fluorophores and the different functionalization groups results in a library of barcoded tracers.

Barcoded tracers have several advantages. For example, different combinations of different tracers can be used simultaneously or in parallel to provide information about drilling operations or subterranean formations. For example, two or more uniquely identifiable tracers can be injected at two or more different drilling sites and can yield information about inter well connectivity. In another example, uniquely identifiable tracers can be injected at the same drilling site at different times, can yield temporal information about transit time, depth, or length of subterranean fractures or formations.

Further, the two-factor nature of the barcode tracers allows for an advantageous two-factor analysis. The first factor, the fluorescence signal, can be detected in an initial, rapid analysis. Accordingly, samples recovered from a drilling operation or subterranean formation can be quickly and qualitative analyzed for the presence of a fluorescence signal, i.e., a 'yes/no' analysis. In some implementations, this first analysis can be done on-site, and samples exhibiting a fluorescence signal can be allocated for further processing. Next, the samples exhibiting a fluorescence signal can be subsequently separated and analyzed by mass or chromatographic methods, for example by high performance liquid chromatography (HPLC), mass spectrometry (MS), or liquid chromatography-mass spectrometry (LC-MS) analysis.

A chemical method to modify the structures of conventional dye molecules by introducing molecular barcode information and by tailoring the hydrophobicity of the dye molecules is described herein. The resulting compounds expand the number of dyes available for tracer applications as oil tracers or partition tracers.

The new dye molecules include substituted thioureas represented by the general structure of the reaction product shown in Equation 1. As shown in Equation 1, the new dye molecules can be synthesized by reacting an isothiocyanate ($R_I$—NCS) with a primary amine ($R_{II}$—NH$_2$). The $R_I$ group is a hydrophobic group which can be aliphatic or aromatic. In the general structure, $R_I$ can be selected from the group that includes hydrogen, alkoxy, haloalkoxy (including Cl, Br, or I), aryl, or heteroaryl (including N, NH, O, or S). The $R_I$ group confers a molecular fingerprint or barcode structure into the new dye molecules. The $R_{II}$ group is a hydrophobic aromatic group that is fluorescent. The $R_{II}$ group can be detectable by optical methods, for example, fluorescence imaging or molecular spectroscopy (absorbance or fluorescence). The substituted thioureas (new dye molecules) are detectable by spectroscopy methods, for example, UV Visible spectroscopy (UV-Vis), fluorescence, Fourier-transform infrared spectroscopy (FTIR), Raman spectroscopy, mass spectroscopy, or chromatography (such as HPLC or LC-MS).

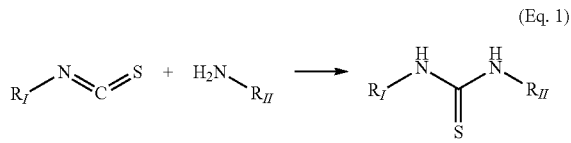

(Eq. 1)

Figure 2:
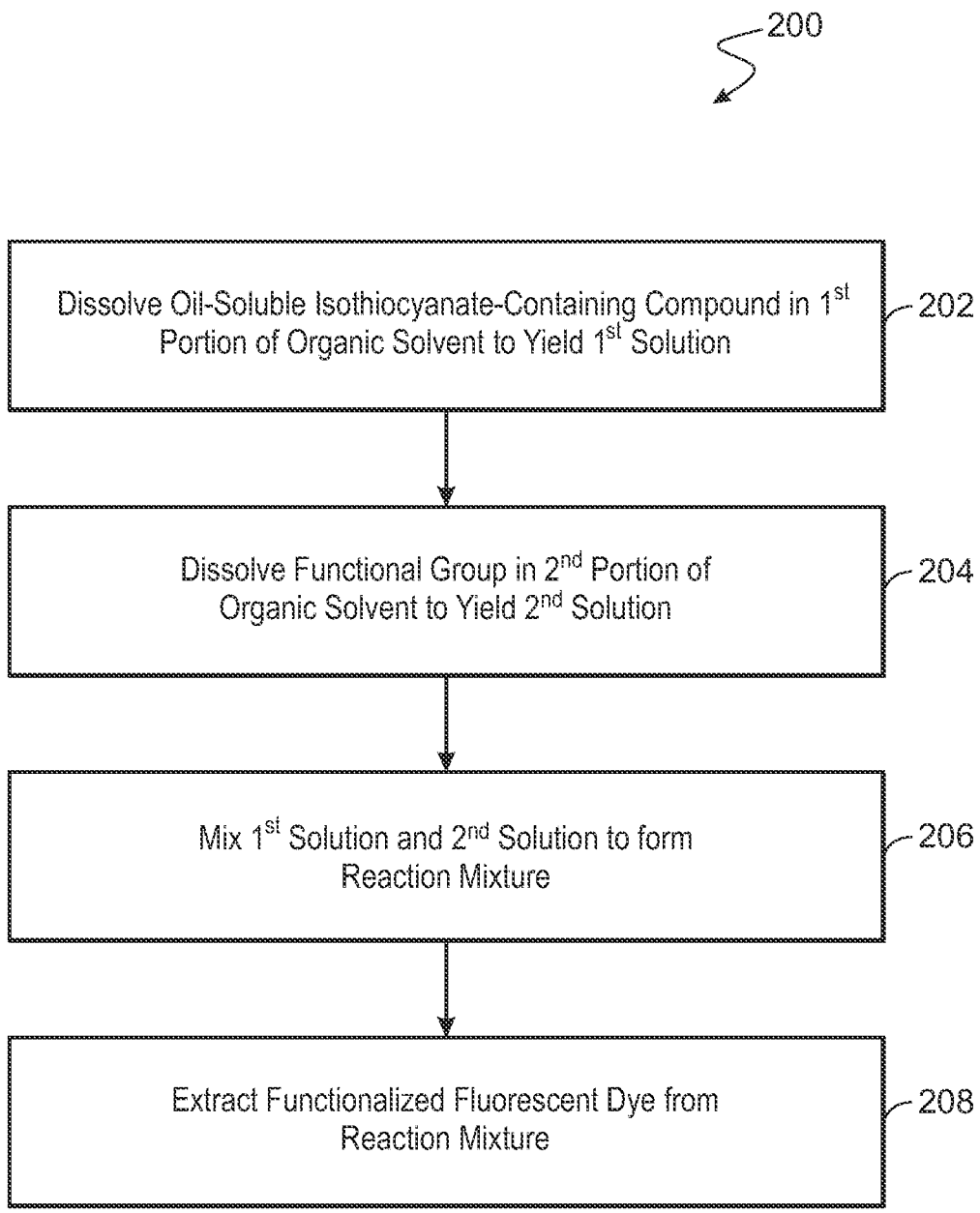
FIG. 2 is a flow chart of an example method for making a functionalized fluorescent dye that can be used in the well of FIG. 1.

FIG. 2 is a flow chart of an example method 200 of making a functionalized fluorescent dye. The functionalized fluorescent dye can be used, for example, to trace an oil phase in a subterranean formation. Method 200 can be implemented to form a substituted thiourea (reaction product of Equation 1). The reactions were performed at room temperature in an organic solvent. At block 202, an oil-soluble isothiocyanate-containing compound is dissolved in a first portion of the organic solvent to yield a first solution. The oil-soluble isothiocyanate-containing compound can be considered a barcode that can be detected and used to identify the functionalized fluorescent dye that is to be formed and used as an oil tracer. At block 204, an aromatic/heterocyclic compound including a primary amino group is dissolved in a second portion of the organic solvent to yield a second solution. The aromatic/heterocyclic compound at block 204 is a primary amine. The aromatic/heterocyclic compound at block 204 is a fluorophore. The organic solvent at blocks 202 and 204 is any organic solvent in which both the oil-soluble isothiocyanate-containing compound and the aromatic/heterocyclic compound are soluble. For example, the organic solvent at blocks 202 and 204 is methanol, ethanol, propanol, isopropanol, chloroform, dichloromethane, acetone, cyclohexane, hexane, benzene, or toluene. The first solution and the second solution each contain the same molecular molar concentration of the oil-soluble isothiocyanate-containing compound and the aromatic/heterocyclic compound, respectively. At block 206, the first solution and the second solution are mixed to form a reaction mixture. In some implementations, the first solution and the second solution are mixed in equal volumes at block 206 and stirred vigorously. In some implementations, the reaction between the oil-soluble isothiocyanate-containing compound and the aromatic/heterocyclic compound is allowed to continue while stirring for at least 12 hours, at least 14 hours, at least 16 hours, at least 18 hours, at least 20 hours, at least 22 hours, or at least 24 hours at block 206. At block 208, a functionalized fluorescent dye is extracted from the reaction mixture. The functionalized fluorescent dye extracted at block 208 is a reaction product of the oil-soluble isothiocyanate-containing compound and the aromatic/heterocyclic compound including the primary amino group. The functionalized fluorescent dye extracted at block 208 is the new dye molecule that can be used as an oil tracer. In some implementations, extracting the functionalized fluorescent dye from the reaction mixture at block 208 includes evaporating the organic solvent by nitrogen bubbling, heating, rotary evaporation, or a combination of these. The obtained solid powder (functionalized fluorescent dye) can be re-dispersed into a different organic solvent, such as crude oil, diesel, mineral oil, food oil, methanol, ethanol, propanol, isopropanol, butanol, pentanol, hexanol, heptanol, octenol, acetone, ethyl acetate, acetonitrile, chloroform, hexane, heptane, cyclohexane, benzene, toluene, tetrahydrofuran, or any combination of these.

Table 1 illustrates different oil-soluble isothiocyanate-containing compounds. The compounds shown in Table 1 include different alkyl functional groups. The oil-soluble isothiocyanate-containing compound (used in block 202 of method 200) can be selected from any of the compounds shown in Table 1. $R_I$—NCS for forming a substituted thiourea (reaction product of Equation 1) can be selected from any of the compounds shown in Table 1.

TABLE 1

Isothiocyanate-containing Compounds with Alkyl Functional Groups

| Compound | Molecular Structure/Weight (Daltons) | CAS number |
| --- | --- | --- |
| Methyl isothiocyanate | 73.12 | 556-61-6 |
| Ethyl isothiocyanate | 87.15 | 542-85-8 |
| Propyl isothiocyanate | 101.17 | 628-30-8 |
| Isopropyl isothiocyanate | 101.17 | 2253-73-8 |
| Butyl isothiocyanate | 115.20 | 592-82-5 |
| Tert-butyl isothiocyanate | 115.20 | 590-42-1 |
| Hexyl isothiocyanate | 143.25 | 4404-45-9 |

TABLE 1-continued

Isothiocyanate-containing Compounds with Alkyl Functional Groups

| Compound | Molecular Structure/Weight (Daltons) | CAS number |
|---|---|---|
| Octyl isothiocyanate | 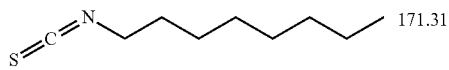 171.31 | 4430-45-9 |
| Decyl isothiocyanate | 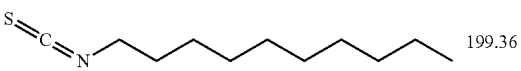 199.36 | 24540-94-1[PH1] |
| Dodecyl isothiocyanate | 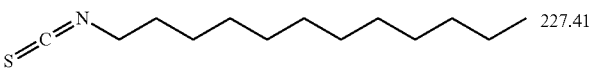 227.41 | 1072-32-8[PH2] |
| Tetradecyl isothiocyanate | 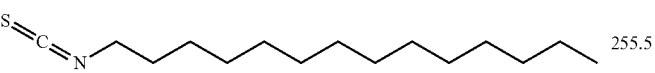 [SMILES: CCCCCCCCCCCCCCN=C=S] 255.5 | 3224-48-4[PH3] |
| Hexadecyl isothiocyanate | 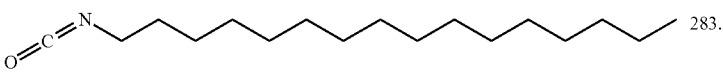 283.5 | 4426-87-3[PH4] |
| Octadecyl isothiocyanate | 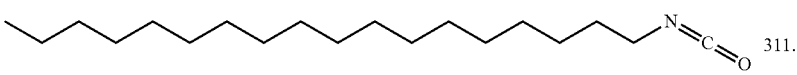 311.6 | 2877-26-1[PH5] |

Table 2 illustrates different oil-soluble isothiocyanate-containing compounds. The compounds shown in Table 2 include different cyclic groups. The cyclic groups can be aromatic or non-aromatic. The oil-soluble isothiocyanate-containing compound (used in block 202 of method 200) can be selected from any of the compounds shown in Table 2. $R_f$—NCS for forming a substituted thiouruea (reaction product of Equation 1) can be selected from any of the compounds shown in Table 2.

TABLE 2

Isothiocyanate-containing Compounds with Cyclic Groups

| Compound | Molecular Structure/Weight (Daltons) | CAS number |
|---|---|---|
| Phenyl isothiocyanate |  135.19 | 103-72-0 |
| Benzyl isothiocyanate |  149.21 | 622-78-6 |
| Phenylethyl isothiocyanate |  163.24 | 2257-09-2 |
| Cyclohexyl isothiocyanate |  141.24 | 1122-82-3 |

TABLE 2-continued

Isothiocyanate-containing Compounds with Cyclic Groups

| Compound | Molecular Structure/Weight (Daltons) | CAS number |
|---|---|---|
| Cyclohexylmethyl isothiocyanate | 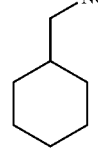 155.26 | 52395-66-1 |
| 2-piperidinoethyl isothiocyanate | 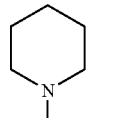 170.28 | 32813-24-4 |
| p-Tolyl isothiocyanate | 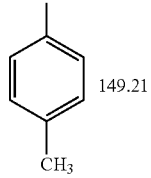 149.21 | 622-59-3 |
| 2,6-dimethylphenyl isothiocyanate | 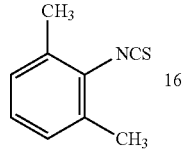 163.24 | 19241-16-8 |
| 4-ethylphenyl isothiocyanate | 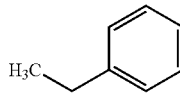 163.24 | 18856-63-8 |

TABLE 2-continued

Isothiocyanate-containing Compounds with Cyclic Groups

| Compound | Molecular Structure/Weight (Daltons) | CAS number |
|---|---|---|
| 4-methoxyphenyl isothiocyanate | 165.21 | 2284-20-0 |
| 2,4-dimethoxyphenyl isothiocyanate | 195.24 | 33904-03-9 |
| 4-chlorophenyl isothiocyanate | 169.63 | 2131-55-7 |
| 2,6-dichlorophenyl isothiocyanate | 204.08 | 6590-95-0 |
| 2,4,5-trichlorophenyl isothiocyanate | 238.5 | 23165-46-0 |
| 3-bromophenyl isothiocyanate | 214.08 | 2131-59-1 |
| 2,5-dibromophenyl isothiocyanate | 292.98 | 98041-67-9 |
| 2,4,6-tribromophenyl isothiocyanate | 371.88 | 22134-11-8 |
| 3-fluorophenyl isothiocyanate | 153.18 | 404-72-8 |
| 2,6-difluorophenyl isothiocyanate | 171.17 | 207974-17-2 |
| 2,4,6-trifluorophenyl isothiocyanate | 189.16 | 206761-91-3 |
| 4-(Trifluoromethyl)phenyl isothiocyanate | 203.19 | 1645-65-4 |
| 3,5-Bis(trifluoromethyl)phenyl isothiocyanate | 271.18 | 23165-29-9 |
| 2-Chloro-5-(trifluoromethyl)phenyl isothiocyanate | 237.63 | 23165-49-3 |
| 4-Bromo-2-(trifluoromethyl)phenyl isothiocyanate | 282.08 | 206559-46-8 |
| 4-Fluoro-3-(trifluoromethyl)phenyl isothiocyanate | 221.18 | 302912-43-2 |
| 3-Chloro-4-fluorophenyl isothiocyanate | 187.62 | 137724-66-4 |
| 2-Bromo-4-fluorophenyl isothiocyanate | 232.07 | 183995-72-4 |
| 4-Bromo-2-chlorophenyl isothiocyanate | 248.53 | 98041-69-1 |

Table 3 illustrates different aromatic amine-containing functional groups that can be used to functionalize an isothiocyanate-containing compound. The compounds shown in Table 3 are aromatic or heterocyclic compounds with primary amino groups. The aromatic/heterocyclic compound including the primary amino group (used in block 204 of method 200) can be selected from any of the compounds shown in Table 3. $R_H$—$NH_2$ for forming a substituted thioruea (reaction product of Equation 1) can be selected from any of the compounds shown in Table 3. The compounds have different molecular weights and provide both barcode information and the ability to tailor the hydrophobicity and miscibility with oils of the resulting compound, based on, for example, the number of cyclic rings. Accordingly, isothiocyanate-containing compounds functionalized with the compounds listed in Table 3 can have variable partitioning in oil phases.

TABLE 3

Aromatic Compounds with Primary Amino Groups

| Compound | Molecular Structure/Weight (Daltons) | CAS number |
| --- | --- | --- |
| 1-naphthylamine | 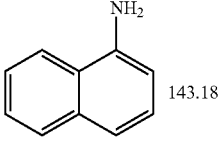 [SMILES: Nc1cccc2ccccc12] 143.18 | 134-32-7 |
| 2-aminoanthracene | 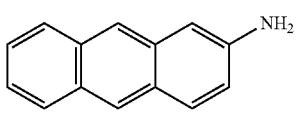 193.24 | 613-13-8 |
| 1-aminopyrene | 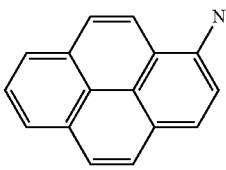 217.26 | 1606-67-3 |
| 6-chrysenamine | 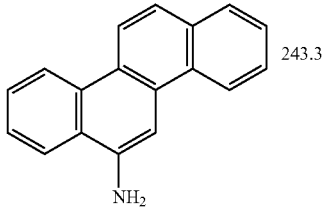 [SMILES: Nc1cc2c3ccccc3ccc2c2ccccc12] 243.3 | 2642-98-0 |
| 9-aminophenanthrene | 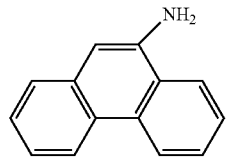 193.24 | 947-73-9 |
| 2-aminofluorene | 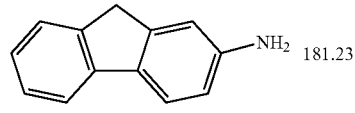 [SMILES: Nc1ccc2c(c1)Cc1ccccc1-2] 181.23 | 153-78-6 |
| 9-aminoacridine | 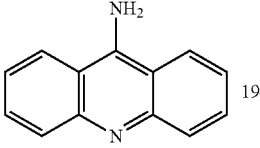 194.23 | 90-45-9 |
| 1,10-phenanthrolin-5-amine | 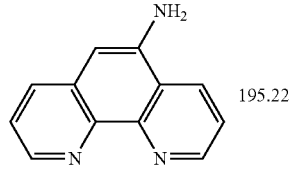 [SMILES: Nc1cc2cccnc2c2ncccc12] 195.22 | 54258-41-2 |

TABLE 3-continued

Aromatic Compounds with Primary Amino Groups

| Compound | Molecular Structure/Weight (Daltons) | CAS number |
|---|---|---|
| 9H-carbazol-2-amine (hydrochloride) | 218.68 | 63716-35-8 |
| 3-amino-9-ethylcarbazole | 210.27 | 132-32-1 |

The dyes described herein can be used as tracers in subterranean applications. For example, multistage hydraulic fracturing along a horizontal well is key to effectively recover hydrocarbons from tight reservoirs. Improving the hydrocarbon recovery requires detailed production information of each hydraulic fracture. Water-soluble chemical tracers are often used to calculate the production profile from multistage fracturing through a tracer flow back test, whereas oil-soluble tracers are used as a direct indicator to estimate the oil production contribution in individual fractures stages, for example, diagnosis of multi-zone oil flow efficiency, confirming zonal oil flow, or qualifying flow assurance. Oil-soluble tracers can also be embedded in the porous media and absorbed on the surfaces of solid carriers, which allows the tracers to be released from their carriers when oil passes through and has negligible partitioning into the water or gas phase.

With the barcoded oil-soluble tracers described herein, qualitative analysis by fluorescence spectroscopy or imaging can be used for early screening if the tracer is in the oil flow from each stage, while detailed molecular barcode information can be revealed by HPLC or LC-MS analysis to identify each tracers from different locations. Further, these synthesized barcoded oil-soluble compounds can also be added to mud formulations in drilling fluids as mud tracers for mud logging applications.

Figure 3:
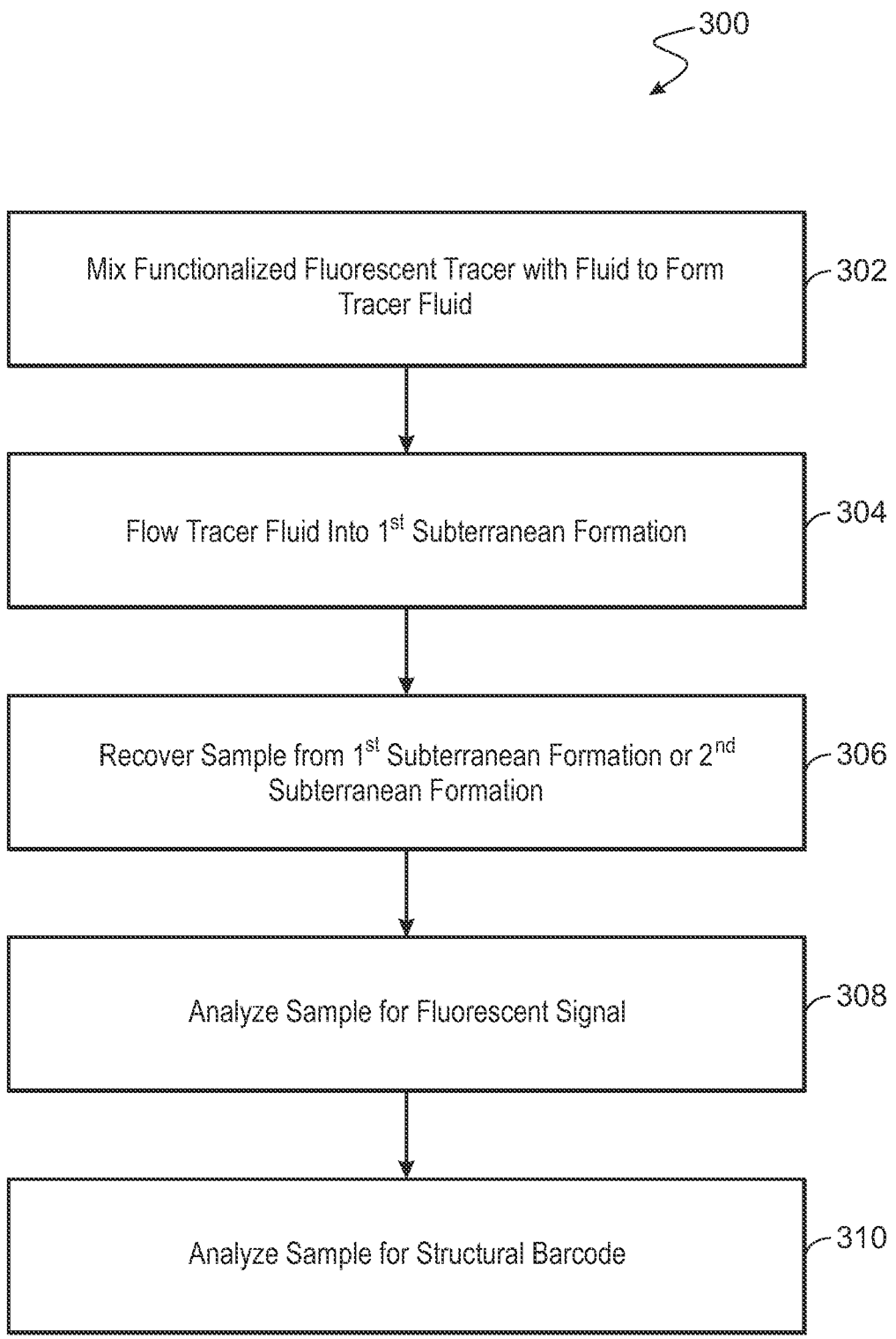
FIG. 3 is a flow chart of an example method for treating a well.

FIG. 3 is a flow chart of an example method 300 of tracing fluid flow in a subterranean formation. At 302, a functionalized fluorescent tracer (such as the functionalized fluorescent tracer formed by method 200) and a fluid are mixed to form a tracer fluid. At 304, the tracer fluid is flowed into a first subterranean formation. At 306, a sample is recovered from the first subterranean formation or a second subterranean formation connected to the first subterranean formation. At 308, the sample is analyzed for a fluorescent signal. At block 310, the sample is analyzed for a barcode structure. Once the barcode structure is determined based on analysis of the sample at block 310, the specific tracer that was used (for example, at blocks 302 and 304) can be identified based on the determined barcode structure.

Example 1

Figure 4:
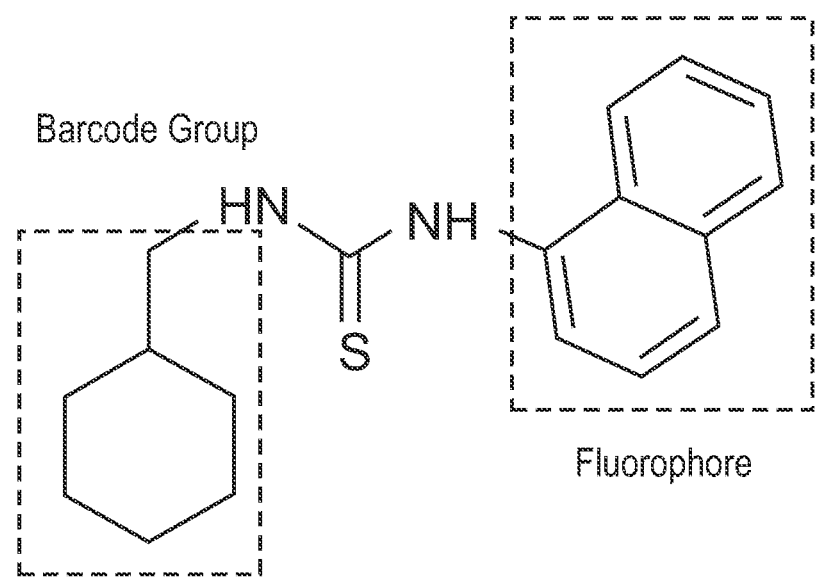
FIG. 4 is a molecular structure of an example functionalized fluorescent dye.

1.43 grams (g) of 1-naphthylamine (Sigma-Aldrich, >99%, MW=143.18) was dissolved in 50 milliliters (mL) of chloroform. 1.55 g of cyclohexylmethyl isothiocyanate (TCI, >98%, MW=155.26) was separately dissolved in 50 mL of chloroform. The two solutions were mixed in a round bottom flask and reacted for more than 24 hours under vigorous stirring by a magnetic stirrer. Assuming all molecules were conjugated to non-symmetrical aliphatic thioureas, the reaction product was an N-(1-naphthylene)-N'-cyclohexylmethylthiourea compound with a nominal concentration of 0.1 molar (M) in chloroform solution. Upon completion of the reaction, the chloroform was evaporated by nitrogen blowdown, and the solid powder sample was collected for further re-dissolving in a different organic solvent. The molecular structure of the functionalized fluorescent dye is shown in FIG. 4.

Example 2

Figure 5:
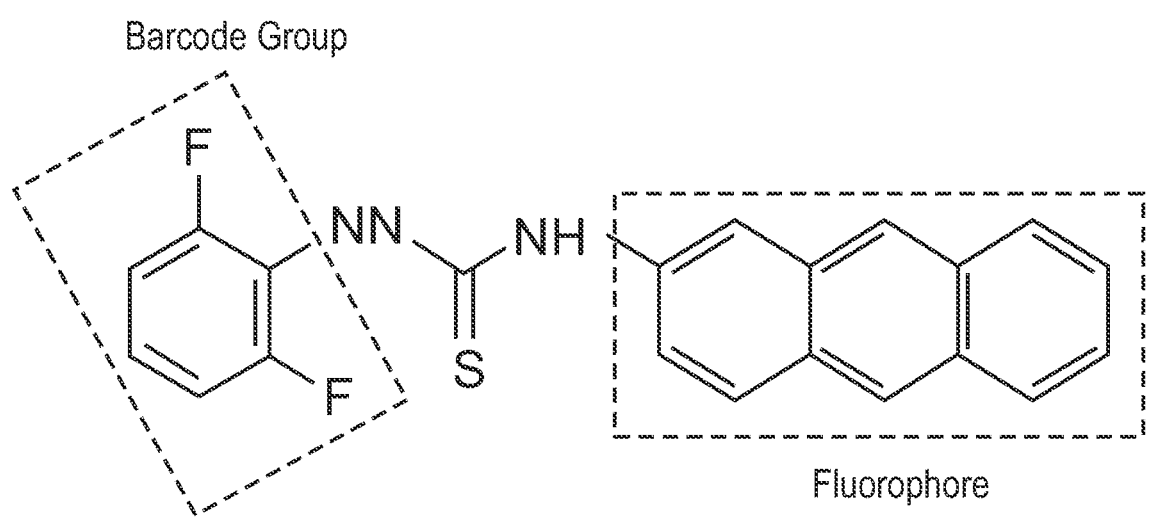
FIG. 5 is a molecular structure of an example functionalized fluorescent dye.

1.93 g of 2-aminoanthracene (Alfa Aesar, 94%, MW=193.24) was dissolved in 50 mL of acetone. 1.71 g of 2,6-difluorophenyl isothiocyanate (Alfa Aesar, 97%, MW=171.17) was separately dissolved in 50 mL of acetone. The two solutions were mixed in a round bottom flask and reacted for more than 24 hours under vigorous stirring by a magnetic stirrer. Assuming all molecules were conjugated to non-symmetrical aromatic thioureas, the reaction product was an N-(2-anthracene)-N'-(2,6-difluorophenyl)thiourea compound with a nominal concentration of 0.1 M in acetone solution. Upon completion of the reaction, the acetone was evaporated by nitrogen blowdown, and the solid powder sample was collected for further re-dissolving in a different organic solvent. The molecular structure of the functionalized fluorescent dye is shown in FIG. 5.

Example 3

Figure 6:
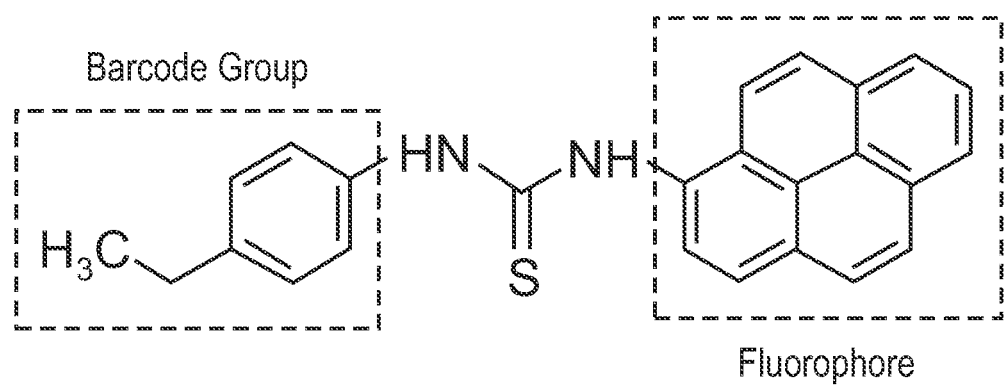
FIG. 6 is a molecular structure of an example functionalized fluorescent dye.

2.17 g of 1-aminopyrene (TCI, >98%, MW=217.26) was dissolved in 50 mL of acetone. 1.63 g of 4-ethylphenyl isothiocyanate (Alfa Aesar, 97%, MW=163.24) was separately dissolved in 50 mL of acetone. The two solutions were mixed in a round bottom flask and reacted for more than 24 hours under vigorous stirring by a magnetic stirrer. Assuming all molecules were conjugated to non-symmetrical aromatic thioureas, the reaction product was an N-(1-pyrene)-N'-(4-ethylbenzyl)thiourea compound with a nominal concentration of 0.1 M in acetone solution. Upon completion of the reaction, the acetone was evaporated by nitrogen blowdown, and the solid powder sample was collected for further re-dissolving in a different organic solvent. The molecular structure of the functionalized fluorescent dye is shown in FIG. 6.

Example 4

Figure 7:
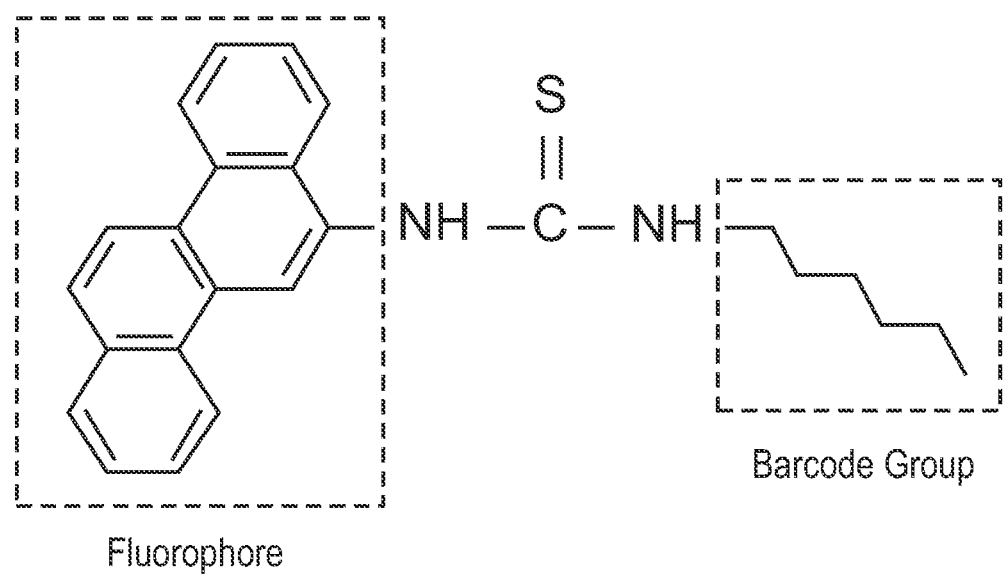
FIG. 7 is a molecular structure of an example functionalized fluorescent dye.

2.43 g of 6-chrysenamine (Sigma-Aldrich, 95%, MW=243.3) was dissolved in 50 mL of acetone. 1.43 g of hexyl isothiocyanate (Alfa Aesar, 97%, MW=143.25) was separately dissolved in 50 mL of acetone. The two solutions were mixed in a round bottom flask and reacted for more than 24 hours under vigorous stirring by a magnetic stirrer. Assuming all molecules were conjugated to aromatic-aliphatic thioureas, the reaction product was an N-(6-chrysene)-N'-hexylthiourea compound with a nominal concentration of 0.1 M in acetone solution. Upon completion of the reaction, the acetone was evaporated by nitrogen blowdown, and the solid powder sample was collected for further re-dissolving in a different organic solvent. The molecular structure of the functionalized fluorescent dye is shown in FIG. 7.

Example 5

Figure 8:
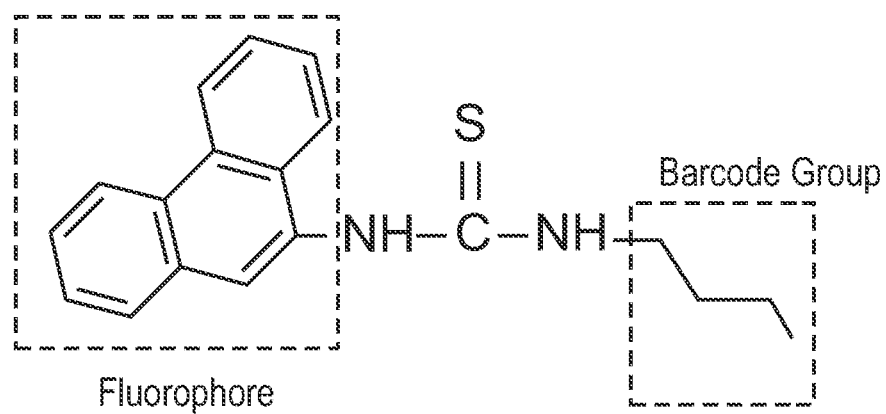
FIG. 8 is a molecular structure of an example functionalized fluorescent dye.

1.93 g of 9-aminophenanthrene (Alfa Aesar, 96%, MW=193.24) was dissolved in 50 mL of chloroform. 1.15 g of butyl isothiocyanate (Matrix Scientific, 99%, MW=115.2) was separately dissolved in 50 mL of chloroform. The two solutions were mixed in a round bottom flask and reacted for more than 24 hours under vigorous stirring by a magnetic stirrer. Assuming all molecules were conjugated to aromatic-aliphatic thioureas, the reaction product was an N-(9-phenanthrene)-N'-butylthiourea compound with a nominal concentration of 0.1 M in chloroform solution. Upon completion of the reaction, the chloroform was evaporated by nitrogen blowdown, and the solid powder sample was collected for further re-dissolving in a different organic solvent. The molecular structure of the functionalized fluorescent dye is shown in FIG. 8.

Example 6

Figure 9:
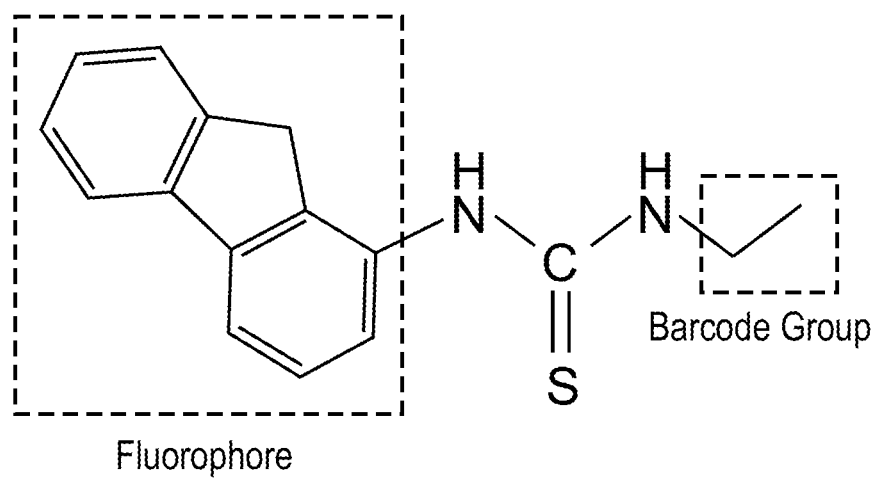
FIG. 9 is a molecular structure of an example functionalized fluorescent dye.

2.17 g of 1-aminofluorene (TCI, >98%, MW=181.23) was dissolved in 50 mL of ethanol. 0.87 g of ethyl isothiocyanate (Alfa Aesar, 97%, MW=87.15) was separately dissolved in 50 mL of ethanol. The two solutions were mixed in a round bottom flask and reacted for more than 24 hours under vigorous stirring by a magnetic stirrer. Assuming all molecules were conjugated to aromatic-aliphatic thioureas, the reaction product was an N-(1-fluorene)-N'-ethylthiourea compound with a nominal concentration of 0.1 M in ethanol solution. Upon completion of the reaction, the ethanol was evaporated by nitrogen blowdown, and the solid powder sample was collected for further re-dissolving in a different organic solvent. The molecular structure of the functionalized fluorescent dye is shown in FIG. 9.

Example 7

Figure 10:
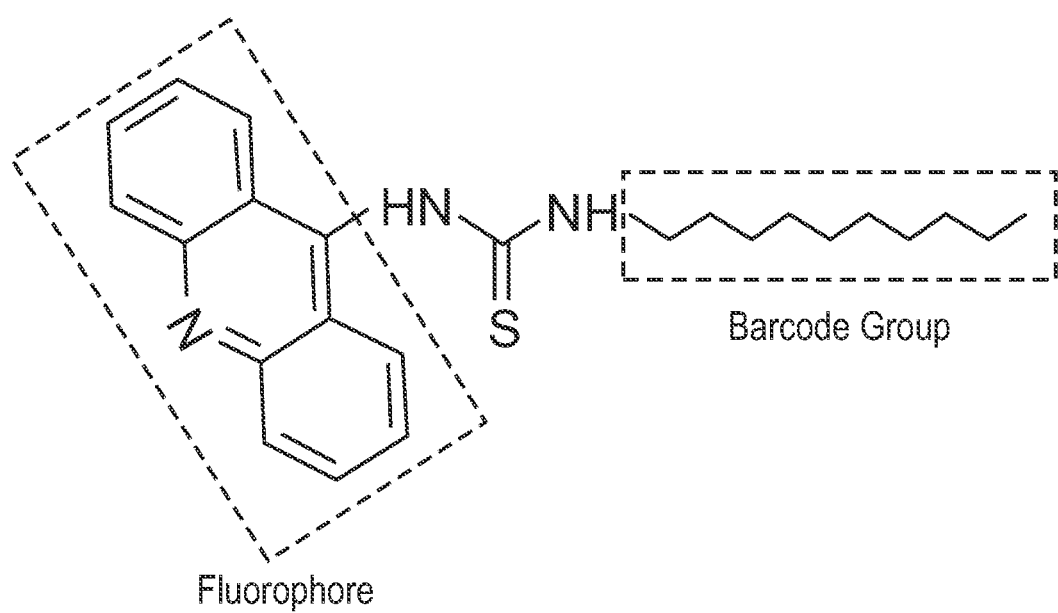
FIG. 10 is a molecular structure of an example functionalized fluorescent dye.

1.94 g of 9-aminoacridine (TCI, >97%, MW=194.24) was dissolved in 50 mL of ethanol. 1.99 g of decyl isothiocyanate (Matrix Scientific, 99%, MW=199.36) was separately dissolved in 50 mL of ethanol. The two solutions were mixed in a round bottom flask and reacted for more than 24 hours under vigorous stirring by a magnetic stirrer. Assuming all molecules were conjugated to aromatic-aliphatic thioureas, the reaction product was an N-(9-acridine)-N'-decylthiourea compound with a nominal concentration of 0.1 M in ethanol solution. Upon completion of the reaction, the ethanol was evaporated by nitrogen blowdown, and the solid powder sample was collected for further re-dissolving in a different organic solvent. The molecular structure of the functionalized fluorescent dye is shown in FIG. 10.

Example 8

Figure 11:
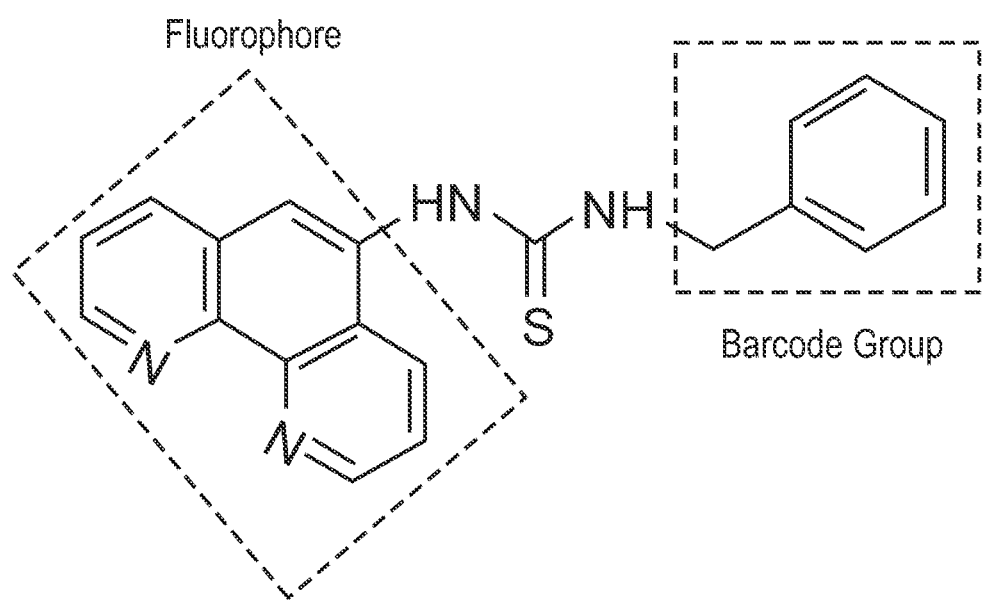
FIG. 11 is a molecular structure of an example functionalized fluorescent dye.

1.95 g of 1,10-phenanthrolin-5-amine (AmBeed, 98%, MW=195.22) was dissolved in 50 mL of ethanol. 1.49 g of benzyl isothiocyanate (Acros Organics, 98%, MW=149.21) was separately dissolved in 50 mL of ethanol. The two solutions were mixed in a round bottom flask and reacted for more than 24 hours under vigorous stirring by a magnetic stirrer. Assuming all molecules were conjugated to non-symmetrical aromatic thioureas, the reaction product was an N-(5-(1,10-phenanthroline))-N'-benzylthiourea compound with a nominal concentration of 0.1 M in ethanol solution. Upon completion of the reaction, the ethanol was evaporated by nitrogen blowdown, and the solid powder sample was collected for further re-dissolving in a different organic solvent. The molecular structure of the functionalized fluorescent dye is shown in FIG. 11.

Example 9

Figure 12:
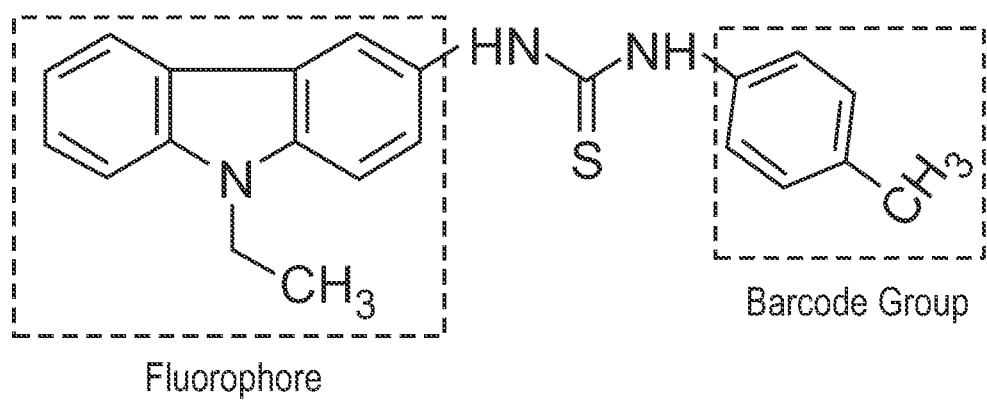
FIG. 12 is a molecular structure of an example functionalized fluorescent dye.

2.10 g of 3-amino-9-ethylcarbazole (Acros Organics, 90% Tech, MW=210.27) was dissolved in 50 mL of chloroform. 1.49 g of p-tolyl isothiocyanate (Sigma-Aldrich, 97%, MW=149.21) was separately dissolved in 50 mL of chloroform. The two solutions were mixed in a round bottom flask and reacted for more than 24 hours under vigorous stirring by a magnetic stirrer. Assuming all molecules were conjugated to non-symmetrical aromatic thioureas, the reaction product was an N-(3-(9-ethylcarbazole))-N'-tolylthiourea compound with a nominal concentration of 0.1 M in chloroform solution. Upon completion of the reaction, the chloroform was evaporated by nitrogen blowdown, and the solid powder sample was collected for further re-dissolving in a different organic solvent. The molecular structure of the functionalized fluorescent dye is shown in FIG. 12.

Examples 1, 2, 3, 4, 5, 6, 7, 8, and 9 provide example procedures for making a functionalized fluorescent dye. With similar procedures, any one of the isothiocyanate-containing compounds shown in Table 1 can be combined with any one of the aromatic compounds with primary amino groups shown in Table 3. With similar procedures, any one of the isothiocyanate-containing compounds shown in Table 2 can be combined with any one of the aromatic compounds with primary amino groups shown in Table 3. The following two paragraphs include example combinations of isothiocyanate-containing compounds and aromatic compounds with primary amino groups that can be combined to make a functionalized fluorescent dye.

Methyl isothiocyanate and 1-naphthylamine can be combined to make a functionalized fluorescent dye. Methyl isothiocyanate and 2-aminoanthracene can be combined to make a functionalized fluorescent dye. Methyl isothiocyanate and 1-aminopyrene can be combined to make a functionalized fluorescent dye. Methyl isothiocyanate and 6-chrysenamine can be combined to make a functionalized fluorescent dye. Methyl isothiocyanate and 9-aminophenanthrene can be combined to make a functionalized fluorescent dye. Methyl isothiocyanate and 2-aminofluorene can be combined to make a functionalized fluorescent dye. Methyl isothiocyanate and 9-aminoacridine can be combined to make a functionalized fluorescent dye. Methyl isothiocyanate and 1,10-phenanthrolin-5-amine can be combined to make a functionalized fluorescent dye. Methyl isothiocyanate and 9H-carbazol-2-amine (hydrochloride)

can be combined to make a functionalized fluorescent dye. Methyl isothiocyanate and 3-amino-9-ethylcarbazole can be combined to make a functionalized fluorescent dye. Ethyl isothiocyanate and 1-naphthylamine can be combined to make a functionalized fluorescent dye. Ethyl isothiocyanate and 2-aminoanthracene can be combined to make a functionalized fluorescent dye. Ethyl isothiocyanate and 1-aminopyrene can be combined to make a functionalized fluorescent dye. Ethyl isothiocyanate and 6-chrysenamine can be combined to make a functionalized fluorescent dye. Ethyl isothiocyanate and 9-aminophenanthrene can be combined to make a functionalized fluorescent dye. Ethyl isothiocyanate and 2-aminofluorene can be combined to make a functionalized fluorescent dye. Ethyl isothiocyanate and 9-aminoacridine can be combined to make a functionalized fluorescent dye. Ethyl isothiocyanate and 1,10-phenanthrolin-5-amine can be combined to make a functionalized fluorescent dye. Ethyl isothiocyanate and 9H-carbazol-2-amine (hydrochloride) can be combined to make a functionalized fluorescent dye. Ethyl isothiocyanate and 3-amino-9-ethylcarbazole can be combined to make a functionalized fluorescent dye. Propyl isothiocyanate and 1-naphthylamine can be combined to make a functionalized fluorescent dye. Propyl isothiocyanate and 2-aminoanthracene can be combined to make a functionalized fluorescent dye. Propyl isothiocyanate and 1-aminopyrene can be combined to make a functionalized fluorescent dye. Propyl isothiocyanate and 6-chrysenamine can be combined to make a functionalized fluorescent dye. Propyl isothiocyanate and 9-aminophenanthrene can be combined to make a functionalized fluorescent dye. Propyl isothiocyanate and 2-aminofluorene can be combined to make a functionalized fluorescent dye. Propyl isothiocyanate and 9-aminoacridine can be combined to make a functionalized fluorescent dye. Propyl isothiocyanate and 1,10-phenanthrolin-5-amine can be combined to make a functionalized fluorescent dye. Propyl isothiocyanate and 9H-carbazol-2-amine (hydrochloride) can be combined to make a functionalized fluorescent dye. Propyl isothiocyanate and 3-amino-9-ethylcarbazole can be combined to make a functionalized fluorescent dye. Isopropyl isothiocyanate and 1-naphthylamine can be combined to make a functionalized fluorescent dye. Isopropyl isothiocyanate and 2-aminoanthracene can be combined to make a functionalized fluorescent dye. Isopropyl isothiocyanate and 1-aminopyrene can be combined to make a functionalized fluorescent dye. Isopropyl isothiocyanate and 6-chrysenamine can be combined to make a functionalized fluorescent dye. Isopropyl isothiocyanate and 9-aminophenanthrene can be combined to make a functionalized fluorescent dye. Isopropyl isothiocyanate and 2-aminofluorene can be combined to make a functionalized fluorescent dye. Isopropyl isothiocyanate and 9-aminoacridine can be combined to make a functionalized fluorescent dye. Isopropyl isothiocyanate and 1,10-phenanthrolin-5-amine can be combined to make a functionalized fluorescent dye. Isopropyl isothiocyanate and 9H-carbazol-2-amine (hydrochloride) can be combined to make a functionalized fluorescent dye. Isopropyl isothiocyanate and 3-amino-9-ethylcarbazole can be combined to make a functionalized fluorescent dye. Butyl isothiocyanate and 1-naphthylamine can be combined to make a functionalized fluorescent dye. Butyl isothiocyanate and 2-aminoanthracene can be combined to make a functionalized fluorescent dye. Butyl isothiocyanate and 1-aminopyrene can be combined to make a functionalized fluorescent dye. Butyl isothiocyanate and 6-chrysenamine can be combined to make a functionalized fluorescent dye. Butyl isothiocyanate and 9-aminophenanthrene can be combined to make a functionalized fluorescent dye. Butyl isothiocyanate and 2-aminofluorene can be combined to make a functionalized fluorescent dye. Butyl isothiocyanate and 9-aminoacridine can be combined to make a functionalized fluorescent dye. Butyl isothiocyanate and 1,10-phenanthrolin-5-amine can be combined to make a functionalized fluorescent dye. Butyl isothiocyanate and 9H-carbazol-2-amine (hydrochloride) can be combined to make a functionalized fluorescent dye. Butyl isothiocyanate and 3-amino-9-ethylcarbazole can be combined to make a functionalized fluorescent dye. Tert-butyl isothiocyanate and 1-naphthylamine can be combined to make a functionalized fluorescent dye. Tert-butyl isothiocyanate and 2-aminoanthracene can be combined to make a functionalized fluorescent dye. Tert-butyl isothiocyanate and 1-aminopyrene can be combined to make a functionalized fluorescent dye. Tert-butyl isothiocyanate and 6-chrysenamine can be combined to make a functionalized fluorescent dye. Tert-butyl isothiocyanate and 9-aminophenanthrene can be combined to make a functionalized fluorescent dye. Tert-butyl isothiocyanate and 2-aminofluorene can be combined to make a functionalized fluorescent dye. Tert-butyl isothiocyanate and 9-aminoacridine can be combined to make a functionalized fluorescent dye. Tert-butyl isothiocyanate and 1,10-phenanthrolin-5-amine can be combined to make a functionalized fluorescent dye. Tert-butyl isothiocyanate and 9H-carbazol-2-amine (hydrochloride) can be combined to make a functionalized fluorescent dye. Tert-butyl isothiocyanate and 3-amino-9-ethylcarbazole can be combined to make a functionalized fluorescent dye. Hexyl isothiocyanate and 1-naphthylamine can be combined to make a functionalized fluorescent dye. Hexyl isothiocyanate and 2-aminoanthracene can be combined to make a functionalized fluorescent dye. Hexyl isothiocyanate and 1-aminopyrene can be combined to make a functionalized fluorescent dye. Hexyl isothiocyanate and 6-chrysenamine can be combined to make a functionalized fluorescent dye. Hexyl isothiocyanate and 9-aminophenanthrene can be combined to make a functionalized fluorescent dye. Hexyl isothiocyanate and 2-aminofluorene can be combined to make a functionalized fluorescent dye. Hexyl isothiocyanate and 9-aminoacridine can be combined to make a functionalized fluorescent dye. Hexyl isothiocyanate and 1,10-phenanthrolin-5-amine can be combined to make a functionalized fluorescent dye. Hexyl isothiocyanate and 9H-carbazol-2-amine (hydrochloride) can be combined to make a functionalized fluorescent dye. Hexyl isothiocyanate and 3-amino-9-ethylcarbazole can be combined to make a functionalized fluorescent dye. Octyl isothiocyanate and 1-naphthylamine can be combined to make a functionalized fluorescent dye. Octyl isothiocyanate and 2-aminoanthracene can be combined to make a functionalized fluorescent dye. Octyl isothiocyanate and 1-aminopyrene can be combined to make a functionalized fluorescent dye. Octyl isothiocyanate and 6-chrysenamine can be combined to make a functionalized fluorescent dye. Octyl isothiocyanate and 9-aminophenanthrene can be combined to make a functionalized fluorescent dye. Octyl isothiocyanate and 2-aminofluorene can be combined to make a functionalized fluorescent dye. Octyl isothiocyanate and 9-aminoacridine can be combined to make a functionalized fluorescent dye. Octyl isothiocyanate and 1,10-phenanthrolin-5-amine can be combined to make a functionalized fluorescent dye. Octyl isothiocyanate and 9H-carbazol-2-amine (hydrochloride) can be combined to make a functionalized fluorescent dye. Octyl isothiocyanate and 3-amino-9-ethylcarbazole can be combined to make a functionalized fluorescent dye. Decyl isothiocyanate and 1-naphthylamine can be combined to make a functionalized fluorescent dye. Decyl isothiocyanate and 2-aminoanthracene can be combined to make a functionalized fluorescent dye. Decyl isothiocyanate and 1-aminopyrene can be combined to make a functionalized fluorescent dye. Decyl isothiocyanate and 6-chrysenamine can be combined to make a functionalized fluorescent dye. Decyl isothiocyanate and 9-aminophenanthrene can be combined to make a functionalized fluorescent dye. Decyl isothiocyanate and 2-aminofluorene can be combined to make a functionalized fluorescent dye. Decyl isothiocyanate and 9-aminoacridine can be combined to make a functionalized fluorescent dye. Decyl isothiocyanate and 1,10-phenanthrolin-5-amine can be combined to make a functionalized fluorescent dye. Decyl isothiocyanate and 9H-carbazol-2-amine (hydrochloride) can be combined to make a functionalized fluorescent dye. Decyl isothiocyanate and 3-amino-9-ethylcarbazole can be combined to make a functionalized fluorescent dye. Dodecyl isothiocyanate and 1-naphthylamine can be combined to make a functionalized fluorescent dye. Dodecyl isothiocyanate and 2-aminoanthracene can be combined to make a functionalized fluorescent dye. Dodecyl isothiocyanate and 1-aminopyrene can be combined to make a functionalized fluorescent dye. Dodecyl isothiocyanate and 6-chrysenamine can be combined to make a functionalized fluorescent dye. Dodecyl isothiocyanate and 9-aminophenanthrene can be combined to make a functionalized fluorescent dye. Dodecyl isothiocyanate and 2-aminofluorene can be combined to make a functionalized fluorescent dye. Dodecyl isothiocyanate and 9-aminoacridine can be combined to make a functionalized fluorescent dye. Dodecyl isothiocyanate and 1,10-phenanthrolin-5-amine can be combined to make a functionalized fluorescent dye. Dodecyl isothiocyanate and 9H-carbazol-2-amine (hydrochloride) can be combined to make a functionalized fluorescent dye. Dodecyl isothiocyanate and 3-amino-9-ethylcarbazole can be combined to make a functionalized fluorescent dye. Tetradecyl isothiocyanate and 1-naphthylamine can be combined to make a functionalized fluorescent dye. Tetradecyl isothiocyanate and 2-aminoanthracene can be combined to make a functionalized fluorescent dye. Tetradecyl isothiocyanate and 1-aminopyrene can be combined to make a functionalized fluorescent dye. Tetradecyl isothiocyanate and 6-chrysenamine can be combined to make a functionalized fluorescent dye. Tetradecyl isothiocyanate and 9-aminophenanthrene can be combined to make a functionalized fluorescent dye. Tetradecyl isothiocyanate and 2-aminofluorene can be combined to make a functionalized fluorescent dye. Tetradecyl isothiocyanate and 9-aminoacridine can be combined to make a functionalized fluorescent dye. Tetradecyl isothiocyanate and 1,10-phenanthrolin-5-amine can be combined to make a functionalized fluorescent dye. Tetradecyl isothiocyanate and 9H-carbazol-2-amine (hydrochloride) can be combined to make a functionalized fluorescent dye. Tetradecyl isothiocyanate and 3-amino-9-ethylcarbazole can be combined to make a functionalized fluorescent dye. Hexadecyl isothiocyanate and 1-naphthylamine can be combined to make a functionalized fluorescent dye. Hexadecyl isothiocyanate and 2-aminoanthracene can be combined to make a functionalized fluorescent dye. Hexadecyl isothiocyanate and 1-aminopyrene can be combined to make a functionalized fluorescent dye. Hexadecyl isothiocyanate and 6-chrysenamine can be combined to make a functionalized fluorescent dye. Hexadecyl isothiocyanate and 9-aminophenanthrene can be combined to make a functionalized fluorescent dye. Hexadecyl isothiocyanate and 2-aminofluorene can be combined to make a functionalized fluorescent dye. Hexadecyl isothiocyanate and 9-aminoacridine can be combined to make a functionalized fluorescent dye. Hexadecyl isothiocyanate and 1,10-phenanthrolin-5-amine can be combined to make a functionalized fluorescent dye. Hexadecyl isothiocyanate and 9H-carbazol-2-amine (hydrochloride) can be combined to make a functionalized fluorescent dye. Hexadecyl isothiocyanate and 3-amino-9-ethylcarbazole can be combined to make a functionalized fluorescent dye. Octadecyl isothiocyanate and 1-naphthylamine can be combined to make a functionalized fluorescent dye. Octadecyl isothiocyanate and 2-aminoanthracene can be combined to make a functionalized fluorescent dye. Octadecyl isothiocyanate and 1-aminopyrene can be combined to make a functionalized fluorescent dye. Octadecyl isothiocyanate and 6-chrysenamine can be combined to make a functionalized fluorescent dye. Octadecyl isothiocyanate and 9-aminophenanthrene can be combined to make a functionalized fluorescent dye. Octadecyl isothiocyanate and 2-aminofluorene can be combined to make a functionalized fluorescent dye. Octadecyl isothiocyanate and 9-aminoacridine can be combined to make a functionalized fluorescent dye. Octadecyl isothiocyanate and 1,10-phenanthrolin-5-amine can be combined to make a functionalized fluorescent dye. Octadecyl isothiocyanate and 9H-carbazol-2-amine (hydrochloride) can be combined to make a functionalized fluorescent dye. Octadecyl isothiocyanate and 3-amino-9-ethylcarbazole can be combined to make a functionalized fluorescent dye.

Phenyl isothiocyanate and 1-naphthylamine can be combined to make a functionalized fluorescent dye. Phenyl isothiocyanate and 2-aminoanthracene can be combined to make a functionalized fluorescent dye. Phenyl isothiocyanate and 1-aminopyrene can be combined to make a functionalized fluorescent dye. Phenyl isothiocyanate and 6-chrysenamine can be combined to make a functionalized fluorescent dye. Phenyl isothiocyanate and 9-aminophenanthrene can be combined to make a functionalized fluorescent dye. Phenyl isothiocyanate and 2-aminofluorene can be combined to make a functionalized fluorescent dye. Phenyl isothiocyanate and 9-aminoacridine can be combined to make a functionalized fluorescent dye. Phenyl isothiocyanate and 1,10-phenanthrolin-5-amine can be combined to make a functionalized fluorescent dye. Phenyl isothiocyanate and 9H-carbazol-2-amine (hydrochloride) can be combined to make a functionalized fluorescent dye. Phenyl isothiocyanate and 3-amino-9-ethylcarbazole can be combined to make a functionalized fluorescent dye. Benzyl isothiocyanate and 1-naphthylamine can be combined to make a functionalized fluorescent dye. Benzyl isothiocyanate and 2-aminoanthracene can be combined to make a functionalized fluorescent dye. Benzyl isothiocyanate and 1-aminopyrene can be combined to make a functionalized fluorescent dye. Benzyl isothiocyanate and 6-chrysenamine can be combined to make a functionalized fluorescent dye. Benzyl isothiocyanate and 9-aminophenanthrene can be combined to make a functionalized fluorescent dye. Benzyl isothiocyanate and 2-aminofluorene can be combined to make a functionalized fluorescent dye. Benzyl isothiocyanate and 9-aminoacridine can be combined to make a functionalized fluorescent dye. Benzyl isothiocyanate and 1,10-phenanthrolin-5-amine can be combined to make a functionalized fluorescent dye. Benzyl isothiocyanate and 9H-carbazol-2-amine (hydrochloride) can be combined to make a functionalized fluorescent dye. Benzyl isothiocyanate and 3-amino-9-ethylcarbazole can be combined to make a functionalized fluorescent dye. Phenylethyl isothiocyanate and 1-naphthylamine can be combined to make a functionalized fluorescent dye. Phenylethyl isothiocyanate and 2-aminoanthracene can be combined to make a functionalized fluorescent dye. Phenylethyl isothiocyanate and 1-aminopyrene can be combined to make a functionalized fluorescent dye. Phenylethyl isothiocyanate and 6-chrysenamine can be combined to make a functionalized fluorescent dye. Phenylethyl isothiocyanate and 9-aminophenanthrene can be combined to make a functionalized fluorescent dye. Phenylethyl isothiocyanate and 2-aminofluorene can be combined to make a functionalized fluorescent dye. Phenylethyl isothiocyanate and 9-aminoacridine can be combined to make a functionalized fluorescent dye. Phenylethyl isothiocyanate and 1,10-phenanthrolin-5-amine can be combined to make a functionalized fluorescent dye. Phenylethyl isothiocyanate and 9H-carbazol-2-amine (hydrochloride) can be combined to make a functionalized fluorescent dye. Phenylethyl isothiocyanate and 3-amino-9-ethylcarbazole can be combined to make a functionalized fluorescent dye. Cyclohexyl isothiocyanate and 1-naphthylamine can be combined to make a functionalized fluorescent dye. Cyclohexyl isothiocyanate and 2-aminoanthracene can be combined to make a functionalized fluorescent dye. Cyclohexyl isothiocyanate and 1-aminopyrene can be combined to make a functionalized fluorescent dye. Cyclohexyl isothiocyanate and 6-chrysenamine can be combined to make a functionalized fluorescent dye. Cyclohexyl isothiocyanate and 9-aminophenanthrene can be combined to make a functionalized fluorescent dye. Cyclohexyl isothiocyanate and 2-aminofluorene can be combined to make a functionalized fluorescent dye. Cyclohexyl isothiocyanate and 9-aminoacridine can be combined to make a functionalized fluorescent dye. Cyclohexyl isothiocyanate and 1,10-phenanthrolin-5-amine can be combined to make a functionalized fluorescent dye. Cyclohexyl isothiocyanate and 9H-carbazol-2-amine (hydrochloride) can be combined to make a functionalized fluorescent dye. Cyclohexyl isothiocyanate and 3-amino-9-ethylcarbazole can be combined to make a functionalized fluorescent dye. Cyclohexylmethyl isothiocyanate and 1-naphthylamine can be combined to make a functionalized fluorescent dye. Cyclohexylmethyl isothiocyanate and 2-aminoanthracene can be combined to make a functionalized fluorescent dye. Cyclohexylmethyl isothiocyanate and 1-aminopyrene can be combined to make a functionalized fluorescent dye. Cyclohexylmethyl isothiocyanate and 6-chrysenamine can be combined to make a functionalized fluorescent dye. Cyclohexylmethyl isothiocyanate and 9-aminophenanthrene can be combined to make a functionalized fluorescent dye. Cyclohexylmethyl isothiocyanate and 2-aminofluorene can be combined to make a functionalized fluorescent dye. Cyclohexylmethyl isothiocyanate and 9-aminoacridine can be combined to make a functionalized fluorescent dye. Cyclohexylmethyl isothiocyanate and 1,10-phenanthrolin-5-amine can be combined to make a functionalized fluorescent dye. Cyclohexylmethyl isothiocyanate and 9H-carbazol-2-amine (hydrochloride) can be combined to make a functionalized fluorescent dye. Cyclohexylmethyl isothiocyanate and 3-amino-9-ethylcarbazole can be combined to make a functionalized fluorescent dye. 2-piperidinoethyl isothiocyanate and 1-naphthylamine can be combined to make a functionalized fluorescent dye. 2-piperidinoethyl isothiocyanate and 2-aminoanthracene can be combined to make a functionalized fluorescent dye. 2-piperidinoethyl isothiocyanate and 1-aminopyrene can be combined to make a functionalized fluorescent dye. 2-piperidinoethyl isothiocyanate and 6-chrysenamine can be combined to make a functionalized fluorescent dye. 2-piperidinoethyl isothiocyanate and 9-aminophenanthrene can be combined to make a functionalized fluorescent dye. 2-piperidinoethyl isothiocyanate and 2-aminofluorene can be combined to make a functionalized fluorescent dye. 2-piperidinoethyl isothiocyanate and 9-aminoacridine can be combined to make a functionalized fluorescent dye. 2-piperidinoethyl isothiocyanate and 1,10-phenanthrolin-5-amine can be combined to make a functionalized fluorescent dye. 2-piperidinoethyl isothiocyanate and 9H-carbazol-2-amine (hydrochloride) can be combined to make a functionalized fluorescent dye. 2-piperidinoethyl isothiocyanate and 3-amino-9-ethylcarbazole can be combined to make a functionalized fluorescent dye. p-Tolyl isothiocyanate and 1-naphthylamine can be combined to make a functionalized fluorescent dye. p-Tolyl isothiocyanate and 2-aminoanthracene can be combined to make a functionalized fluorescent dye. p-Tolyl isothiocyanate and 1-aminopyrene can be combined to make a functionalized fluorescent dye. p-Tolyl isothiocyanate and 6-chrysenamine can be combined to make a functionalized fluorescent dye. p-Tolyl isothiocyanate and 9-aminophenanthrene can be combined to make a functionalized fluorescent dye. p-Tolyl isothiocyanate and 2-aminofluorene can be combined to make a functionalized fluorescent dye. p-Tolyl isothiocyanate and 9-aminoacridine can be combined to make a functionalized fluorescent dye. p-Tolyl isothiocyanate and 1,10-phenanthrolin-5-amine can be combined to make a functionalized fluorescent dye. p-Tolyl isothiocyanate and 9H-carbazol-2-amine (hydrochloride) can be combined to make a functionalized fluorescent dye. p-Tolyl isothiocyanate and 3-amino-9-ethylcarbazole can be combined to make a functionalized fluorescent dye. 2,6-dimethylphenyl isothiocyanate and 1-naphthylamine can be combined to make a functionalized fluorescent dye. 2,6-dimethylphenyl isothiocyanate and 2-aminoanthracene can be combined to make a functionalized fluorescent dye. 2,6-dimethylphenyl isothiocyanate and 1-aminopyrene can be combined to make a functionalized fluorescent dye. 2,6-dimethylphenyl isothiocyanate and 6-chrysenamine can be combined to make a functionalized fluorescent dye. 2,6-dimethylphenyl isothiocyanate and 9-aminophenanthrene can be combined to make a functionalized fluorescent dye. 2,6-dimethylphenyl isothiocyanate and 2-aminofluorene can be combined to make a functionalized fluorescent dye. 2,6-dimethylphenyl isothiocyanate and 9-aminoacridine can be combined to make a functionalized fluorescent dye. 2,6-dimethylphenyl isothiocyanate and 1,10-phenanthrolin-5-amine can be combined to make a functionalized fluorescent dye. 2,6-dimethylphenyl isothiocyanate and 9H-carbazol-2-amine (hydrochloride) can be combined to make a functionalized fluorescent dye. 2,6-dimethylphenyl isothiocyanate and 3-amino-9-ethylcarbazole can be combined to make a functionalized fluorescent dye. 4-ethylphenyl isothiocyanate and 1-naphthylamine can be combined to make a functionalized fluorescent dye. 4-ethylphenyl isothiocyanate and 2-aminoanthracene can be combined to make a functionalized fluorescent dye. 4-ethylphenyl isothiocyanate and 1-aminopyrene can be combined to make a functionalized fluorescent dye. 4-ethylphenyl isothiocyanate and 6-chrysenamine can be combined to make a functionalized fluorescent dye. 4-ethylphenyl isothiocyanate and 9-aminophenanthrene can be combined to make a functionalized fluorescent dye. 4-ethylphenyl isothiocyanate and 2-aminofluorene can be combined to make a functionalized fluorescent dye. 4-ethylphenyl isothiocyanate and 9-aminoacridine can be combined to make a functionalized fluorescent dye. 4-ethylphenyl isothiocyanate and 1,10-phenanthrolin-5-amine can be combined to make a functionalized fluorescent dye. 4-ethylphenyl isothiocyanate and 9H-carbazol-2-amine (hydrochloride) can be combined to make a functionalized fluorescent dye. 4-ethylphenyl isothiocyanate and 3-amino-9-ethylcarbazole can be combined to make a functionalized fluorescent dye. 4-methoxyphenyl isothiocyanate and 1-naphthylamine can be combined to make a functionalized fluorescent dye. 4-methoxyphenyl isothiocyanate and 2-aminoanthracene can be combined to make a functionalized fluorescent dye. 4-methoxyphenyl isothiocyanate and 1-aminopyrene can be combined to make a functionalized fluorescent dye. 4-methoxyphenyl isothiocyanate and 6-chrysenamine can be combined to make a functionalized fluorescent dye. 4-methoxyphenyl isothiocyanate and 9-aminophenanthrene can be combined to make a functionalized fluorescent dye. 4-methoxyphenyl isothiocyanate and 2-aminofluorene can be combined to make a functionalized fluorescent dye. 4-methoxyphenyl isothiocyanate and 9-aminoacridine can be combined to make a functionalized fluorescent dye. 4-methoxyphenyl isothiocyanate and 1,10-phenanthrolin-5-amine can be combined to make a functionalized fluorescent dye. 4-methoxyphenyl isothiocyanate and 9H-carbazol-2-amine (hydrochloride) can be combined to make a functionalized fluorescent dye. 4-methoxyphenyl isothiocyanate and 3-amino-9-ethylcarbazole can be combined to make a functionalized fluorescent dye. 2,4-dimethoxyphenyl isothiocyanate and 1-naphthylamine can be combined to make a functionalized fluorescent dye. 2,4-dimethoxyphenyl isothiocyanate and 2-aminoanthracene can be combined to make a functionalized fluorescent dye. 2,4-dimethoxyphenyl isothiocyanate and 1-aminopyrene can be combined to make a functionalized fluorescent dye. 2,4-dimethoxyphenyl isothiocyanate and 6-chrysenamine can be combined to make a functionalized fluorescent dye. 2,4-dimethoxyphenyl isothiocyanate and 9-aminophenanthrene can be combined to make a functionalized fluorescent dye. 2,4-dimethoxyphenyl isothiocyanate and 2-aminofluorene can be combined to make a functionalized fluorescent dye. 2,4-dimethoxyphenyl isothiocyanate and 9-aminoacridine can be combined to make a functionalized fluorescent dye. 2,4-dimethoxyphenyl isothiocyanate and 1,10-phenanthrolin-5-amine can be combined to make a functionalized fluorescent dye. 2,4-dimethoxyphenyl isothiocyanate and 9H-carbazol-2-amine (hydrochloride) can be combined to make a functionalized fluorescent dye. 2,4-dimethoxyphenyl isothiocyanate and 3-amino-9-ethylcarbazole can be combined to make a functionalized fluorescent dye. 4-chlorophenyl isothiocyanate and 1-naphthylamine can be combined to make a functionalized fluorescent dye. 4-chlorophenyl isothiocyanate and 2-aminoanthracene can be combined to make a functionalized fluorescent dye. 4-chlorophenyl isothiocyanate and 1-aminopyrene can be combined to make a functionalized fluorescent dye. 4-chlorophenyl isothiocyanate and 6-chrysenamine can be combined to make a functionalized fluorescent dye. 4-chlorophenyl isothiocyanate and 9-aminophenanthrene can be combined to make a functionalized fluorescent dye. 4-chlorophenyl isothiocyanate and 2-aminofluorene can be combined to make a functionalized fluorescent dye. 4-chlorophenyl isothiocyanate and 9-aminoacridine can be combined to make a functionalized fluorescent dye. 4-chlorophenyl isothiocyanate and 1,10-phenanthrolin-5-amine can be combined to make a functionalized fluorescent dye. 4-chlorophenyl isothiocyanate and 9H-carbazol-2-amine (hydrochloride) can be combined to make a functionalized fluorescent dye. 4-chlorophenyl isothiocyanate and 3-amino-9-ethylcarbazole can be combined to make a functionalized fluorescent dye. 2,6-dichlorophenyl isothiocyanate and 1-naphthylamine can be combined to make a functionalized fluorescent dye. 2,6-dichlorophenyl isothiocyanate and 2-aminoanthracene can be combined to make a functionalized fluorescent dye. 2,6-dichlorophenyl isothiocyanate and 1-aminopyrene can be combined to make a functionalized fluorescent dye. 2,6-dichlorophenyl isothiocyanate and 6-chrysenamine can be combined to make a functionalized fluorescent dye. 2,6-dichlorophenyl isothiocyanate and 9-aminophenanthrene can be combined to make a functionalized fluorescent dye. 2,6-dichlorophenyl isothiocyanate and 2-aminofluorene can be combined to make a functionalized fluorescent dye. 2,6-dichlorophenyl isothiocyanate and 9-aminoacridine can be combined to make a functionalized fluorescent dye. 2,6-dichlorophenyl isothiocyanate and 1,10-phenanthrolin-5-amine can be combined to make a functionalized fluorescent dye. 2,6-dichlorophenyl isothiocyanate and 9H-carbazol-2-amine (hydrochloride) can be combined to make a functionalized fluorescent dye. 2,6-dichlorophenyl isothiocyanate and 3-amino-9-ethylcarbazole can be combined to make a functionalized fluorescent dye. 2,4,5-trichlorophenyl isothiocyanate and 1-naphthylamine can be combined to make a functionalized fluorescent dye. 2,4,5-trichlorophenyl isothiocyanate and 2-aminoanthracene can be combined to make a functionalized fluorescent dye. 2,4,5-trichlorophenyl isothiocyanate and 1-aminopyrene can be combined to make a functionalized fluorescent dye. 2,4,5-trichlorophenyl isothiocyanate and 6-chrysenamine can be combined to make a functionalized fluorescent dye. 2,4,5-trichlorophenyl isothiocyanate and 9-aminophenanthrene can be combined to make a functionalized fluorescent dye. 2,4,5-trichlorophenyl isothiocyanate and 2-aminofluorene can be combined to make a functionalized fluorescent dye. 2,4,5-trichlorophenyl isothiocyanate and 9-aminoacridine can be combined to make a functionalized fluorescent dye. 2,4,5-trichlorophenyl isothiocyanate and 1,10-phenanthrolin-5-amine can be combined to make a functionalized fluorescent dye. 2,4,5-trichlorophenyl isothiocyanate and 9H-carbazol-2-amine (hydrochloride) can be combined to make a functionalized fluorescent dye. 2,4,5-trichlorophenyl isothiocyanate and 3-amino-9-ethylcarbazole can be combined to make a functionalized fluorescent dye. 3-bromophenyl isothiocyanate and 1-naphthylamine can be combined to make a functionalized fluorescent dye. 3-bromophenyl isothiocyanate and 2-aminoanthracene can be combined to make a functionalized fluorescent dye. 3-bromophenyl isothiocyanate and 1-aminopyrene can be combined to make a functionalized fluorescent dye. 3-bromophenyl isothiocyanate and 6-chrysenamine can be combined to make a functionalized fluorescent dye. 3-bromophenyl isothiocyanate and 9-aminophenanthrene can be combined to make a functionalized fluorescent dye. 3-bromophenyl isothiocyanate and 2-aminofluorene can be combined to make a functionalized fluorescent dye. 3-bromophenyl isothiocyanate and 9-aminoacridine can be combined to make a functionalized fluorescent dye. 3-bromophenyl isothiocyanate and 1,10-phenanthrolin-5-amine can be combined to make a functionalized fluorescent dye. 3-bromophenyl isothiocyanate and 9H-carbazol-2-amine (hydrochloride) can be combined to make a functionalized fluorescent dye. 3-bromophenyl isothiocyanate and 3-amino-9-ethylcarbazole can be combined to make a functionalized fluorescent dye. 2,5-dibromophenyl isothiocyanate and 1-naphthylamine can be combined to make a functionalized fluorescent dye. 2,5-dibromophenyl isothiocyanate and 2-aminoanthracene can be combined to make a functionalized fluorescent dye. 2,5-dibromophenyl isothiocyanate and 1-aminopyrene can be combined to make a functionalized fluorescent dye. 2,5-dibromophenyl isothiocyanate and 6-chrysenamine can be combined to make a functionalized fluorescent dye. 2,5-dibromophenyl isothiocyanate and 9-aminophenanthrene can be combined to make a functionalized fluorescent dye. 2,5-dibromophenyl isothiocyanate and 2-aminofluorene can be combined to make a functionalized fluorescent dye. 2,5-dibromophenyl isothiocyanate and 9-aminoacridine can be combined to make a functionalized fluorescent dye. 2,5-dibromophenyl isothiocyanate and 1,10-phenanthrolin-5-amine can be combined to make a functionalized fluorescent dye. 2,5-dibromophenyl isothiocyanate and 9H-carbazol-2-amine (hydrochloride) can be combined to make a functionalized fluorescent dye. 2,5-dibromophenyl isothiocyanate and 3-amino-9-ethylcarbazole can be combined to make a functionalized fluorescent dye. 2,4,6-tribromophenyl isothiocyanate and 1-naphthylamine can be combined to make a functionalized fluorescent dye. 2,4,6-tribromophenyl isothiocyanate and 2-aminoanthracene can be combined to make a functionalized fluorescent dye. 2,4,6-tribromophenyl isothiocyanate and 1-aminopyrene can be combined to make a functionalized fluorescent dye. 2,4,6-tribromophenyl isothiocyanate and 6-chrysenamine can be combined to make a functionalized fluorescent dye. 2,4,6-tribromophenyl isothiocyanate and 9-aminophenanthrene can be combined to make a functionalized fluorescent dye. 2,4,6-tribromophenyl isothiocyanate and 2-aminofluorene can be combined to make a functionalized fluorescent dye. 2,4,6-tribromophenyl isothiocyanate and 9-aminoacridine can be combined to make a functionalized fluorescent dye. 2,4,6-tribromophenyl isothiocyanate and 1,10-phenanthrolin-5-amine can be combined to make a functionalized fluorescent dye. 2,4,6-tribromophenyl isothiocyanate and 9H-carbazol-2-amine (hydrochloride) can be combined to make a functionalized fluorescent dye. 2,4,6-tribromophenyl isothiocyanate and 3-amino-9-ethylcarbazole can be combined to make a functionalized fluorescent dye. 3-fluorophenyl isothiocyanate and 1-naphthylamine can be combined to make a functionalized fluorescent dye. 3-fluorophenyl isothiocyanate and 2-aminoanthracene can be combined to make a functionalized fluorescent dye. 3-fluorophenyl isothiocyanate and 1-aminopyrene can be combined to make a functionalized fluorescent dye. 3-fluorophenyl isothiocyanate and 6-chrysenamine can be combined to make a functionalized fluorescent dye. 3-fluorophenyl isothiocyanate and 9-aminophenanthrene can be combined to make a functionalized fluorescent dye. 3-fluorophenyl isothiocyanate and 2-aminofluorene can be combined to make a functionalized fluorescent dye. 3-fluorophenyl isothiocyanate and 9-aminoacridine can be combined to make a functionalized fluorescent dye. 3-fluorophenyl isothiocyanate and 1,10-phenanthrolin-5-amine can be combined to make a functionalized fluorescent dye. 3-fluorophenyl isothiocyanate and 9H-carbazol-2-amine (hydrochloride) can be combined to make a functionalized fluorescent dye. 3-fluorophenyl isothiocyanate and 3-amino-9-ethylcarbazole can be combined to make a functionalized fluorescent dye. 2,6-difluorophenyl isothiocyanate and 1-naphthylamine can be combined to make a functionalized fluorescent dye. 2,6-difluorophenyl isothiocyanate and 2-aminoanthracene can be combined to make a functionalized fluorescent dye. 2,6-difluorophenyl isothiocyanate and 1-aminopyrene can be combined to make a functionalized fluorescent dye. 2,6-difluorophenyl isothiocyanate and 6-chrysenamine can be combined to make a functionalized fluorescent dye. 2,6-difluorophenyl isothiocyanate and 9-aminophenanthrene can be combined to make a functionalized fluorescent dye. 2,6-difluorophenyl isothiocyanate and 2-aminofluorene can be combined to make a functionalized fluorescent dye. 2,6-difluorophenyl isothiocyanate and 9-aminoacridine can be combined to make a functionalized fluorescent dye. 2,6-difluorophenyl isothiocyanate and 1,10-phenanthrolin-5-amine can be combined to make a functionalized fluorescent dye. 2,6-difluorophenyl isothiocyanate and 9H-carbazol-2-amine (hydrochloride) can be combined to make a functionalized fluorescent dye. 2,6-difluorophenyl isothiocyanate and 3-amino-9-ethylcarbazole can be combined to make a functionalized fluorescent dye. 2,4,6-trifluorophenyl isothiocyanate and 1-naphthylamine can be combined to make a functionalized fluorescent dye. 2,4,6-trifluorophenyl isothiocyanate and 2-aminoanthracene can be combined to make a functionalized fluorescent dye. 2,4,6-trifluorophenyl isothiocyanate and 1-aminopyrene can be combined to make a functionalized fluorescent dye. 2,4,6-trifluorophenyl isothiocyanate and 6-chrysenamine can be combined to make a functionalized fluorescent dye. 2,4,6-trifluorophenyl isothiocyanate and 9-aminophenanthrene can be combined to make a functionalized fluorescent dye. 2,4,6-trifluorophenyl isothiocyanate and 2-aminofluorene can be combined to make a functionalized fluorescent dye. 2,4,6-trifluorophenyl isothiocyanate and 9-aminoacridine can be combined to make a functionalized fluorescent dye. 2,4,6-trifluorophenyl isothiocyanate and 1,10-phenanthrolin-5-amine can be combined to make a functionalized fluorescent dye. 2,4,6-trifluorophenyl isothiocyanate and 9H-carbazol-2-amine (hydrochloride) can be combined to make a functionalized fluorescent dye. 2,4,6-trifluorophenyl isothiocyanate and 3-amino-9-ethylcarbazole can be combined to make a functionalized fluorescent dye. 4-(Trifluoromethyl)phenyl isothiocyanate and 1-naphthylamine can be combined to make a functionalized fluorescent dye. 4-(Trifluoromethyl)phenyl isothiocyanate and 2-aminoanthracene can be combined to make a functionalized fluorescent dye. 4-(Trifluoromethyl)phenyl isothiocyanate and 1-aminopyrene can be combined to make a functionalized fluorescent dye. 4-(Trifluoromethyl)phenyl isothiocyanate and 6-chrysenamine can be combined to make a functionalized fluorescent dye. 4-(Trifluoromethyl)phenyl isothiocyanate and 9-aminophenanthrene can be combined to make a functionalized fluorescent dye. 4-(Trifluoromethyl)phenyl isothiocyanate and 2-aminofluorene can be combined to make a functionalized fluorescent dye. 4-(Trifluoromethyl)phenyl isothiocyanate and 9-aminoacridine can be combined to make a functionalized fluorescent dye. 4-(Trifluoromethyl)phenyl isothiocyanate and 1,10-phenanthrolin-5-amine can be combined to make a functionalized fluorescent dye. 4-(Trifluoromethyl)phenyl isothiocyanate and 9H-carbazol-2-amine (hydrochloride) can be combined to make a functionalized fluorescent dye. 4-(Trifluoromethyl)phenyl isothiocyanate and 3-amino-9-ethylcarbazole can be combined to make a functionalized fluorescent dye. 3,5-Bis(trifluoromethyl)phenyl isothiocyanate and 1-naphthylamine can be combined to make a functionalized fluorescent dye. 3,5-Bis(trifluoromethyl)phenyl isothiocyanate and 2-aminoanthracene can be combined to make a functionalized fluorescent dye. 3,5-Bis(trifluoromethyl)phenyl isothiocyanate and 1-aminopyrene can be combined to make a functionalized fluorescent dye. 3,5-Bis(trifluoromethyl)phenyl isothiocyanate and 6-chrysenamine can be combined to make a functionalized fluorescent dye. 3,5-Bis(trifluoromethyl)phenyl isothiocyanate and 9-aminophenanthrene can be combined to make a functionalized fluorescent dye. 3,5-Bis(trifluoromethyl)phenyl isothiocyanate and 2-aminofluorene can be combined to make a functionalized fluorescent dye. 3,5-Bis(trifluoromethyl)phenyl isothiocyanate and 9-aminoacridine can be combined to make a functionalized fluorescent dye. 3,5-Bis(trifluoromethyl)phenyl isothiocyanate and 1,10-phenanthrolin-5-amine can be combined to make a functionalized fluorescent dye. 3,5-Bis(trifluoromethyl)phenyl isothiocyanate and 9H-carbazol-2-amine (hydrochloride) can be combined to make a functionalized fluorescent dye. 3,5-Bis(trifluoromethyl)phenyl isothiocyanate and 3-amino-9-ethylcarbazole can be combined to make a functionalized fluorescent dye. 2-Chloro-5-(trifluoromethyl)phenyl isothiocyanate and 1-naphthylamine can be combined to make a functionalized fluorescent dye. 2-Chloro-5-(trifluoromethyl)phenyl isothiocyanate and 2-aminoanthracene can be combined to make a functionalized fluorescent dye. 2-Chloro-5-(trifluoromethyl)phenyl isothiocyanate and 1-aminopyrene can be combined to make a functionalized fluorescent dye. 2-Chloro-5-(trifluoromethyl)phenyl isothiocyanate and 6-chrysenamine can be combined to make a functionalized fluorescent dye. 2-Chloro-5-(trifluoromethyl)phenyl isothiocyanate and 9-aminophenanthrene can be combined to make a functionalized fluorescent dye. 2-Chloro-5-(trifluoromethyl)phenyl isothiocyanate and 2-aminofluorene can be combined to make a functionalized fluorescent dye. 2-Chloro-5-(trifluoromethyl)phenyl isothiocyanate and 9-aminoacridine can be combined to make a functionalized fluorescent dye. 2-Chloro-5-(trifluoromethyl)phenyl isothiocyanate and 1,10-phenanthrolin-5-amine can be combined to make a functionalized fluorescent dye. 2-Chloro-5-(trifluoromethyl)phenyl isothiocyanate and 9H-carbazol-2-amine (hydrochloride) can be combined to make a functionalized fluorescent dye. 2-Chloro-5-(trifluoromethyl)phenyl isothiocyanate and 3-amino-9-ethylcarbazole can be combined to make a functionalized fluorescent dye. 4-Bromo-2-(trifluoromethyl)phenyl isothiocyanate and 1-naphthylamine can be combined to make a functionalized fluorescent dye. 4-Bromo-2-(trifluoromethyl)phenyl isothiocyanate and 2-aminoanthracene can be combined to make a functionalized fluorescent dye. 4-Bromo-2-(trifluoromethyl)phenyl isothiocyanate and 1-aminopyrene can be combined to make a functionalized fluorescent dye. 4-Bromo-2-(trifluoromethyl)phenyl isothiocyanate and 6-chrysenamine can be combined to make a functionalized fluorescent dye. 4-Bromo-2-(trifluoromethyl)phenyl isothiocyanate and 9-aminophenanthrene can be combined to make a functionalized fluorescent dye. 4-Bromo-2-(trifluoromethyl)phenyl isothiocyanate and 2-aminofluorene can be combined to make a functionalized fluorescent dye. 4-Bromo-2-(trifluoromethyl)phenyl isothiocyanate and 9-aminoacridine can be combined to make a functionalized fluorescent dye. 4-Bromo-2-(trifluoromethyl)phenyl isothiocyanate and 1,10-phenanthrolin-5-amine can be combined to make a functionalized fluorescent dye. 4-Bromo-2-(trifluoromethyl)phenyl isothiocyanate and 9H-carbazol-2-amine (hydrochloride) can be combined to make a functionalized fluorescent dye. 4-Bromo-2-(trifluoromethyl)phenyl isothiocyanate and 3-amino-9-ethylcarbazole can be combined to make a functionalized fluorescent dye. 4-Fluoro-3-(trifluoromethyl)phenyl isothiocyanate and 1-naphthylamine can be combined to make a functionalized fluorescent dye. 4-Fluoro-3-(trifluoromethyl)phenyl isothiocyanate and 2-aminoanthracene can be combined to make a functionalized fluorescent dye. 4-Fluoro-3-(trifluoromethyl)phenyl isothiocyanate and 1-aminopyrene can be combined to make a functionalized fluorescent dye. 4-Fluoro-3-(trifluoromethyl)phenyl isothiocyanate and 6-chrysenamine can be combined to make a functionalized fluorescent dye. 4-Fluoro-3-(trifluoromethyl)phenyl isothiocyanate and 9-aminophenanthrene can be combined to make a functionalized fluorescent dye. 4-Fluoro-3-(trifluoromethyl)phenyl isothiocyanate and 2-aminofluorene can be combined to make a functionalized fluorescent dye. 4-Fluoro-3-(trifluoromethyl)phenyl isothiocyanate and 9-aminoacridine can be combined to make a functionalized fluorescent dye. 4-Fluoro-3-(trifluoromethyl)phenyl isothiocyanate and 1,10-phenanthrolin-5-amine can be combined to make a functionalized fluorescent dye. 4-Fluoro-3-(trifluoromethyl)phenyl isothiocyanate and 9H-carbazol-2-amine (hydrochloride) can be combined to make a functionalized fluorescent dye. 4-Fluoro-3-(trifluoromethyl)phenyl isothiocyanate and 3-amino-9-ethylcarbazole can be combined to make a functionalized fluorescent dye. 3-Chloro-4-fluorophenyl isothiocyanate and 1-naphthylamine can be combined to make a functionalized fluorescent dye. 3-Chloro-4-fluorophenyl isothiocyanate and 2-aminoanthracene can be combined to make a functionalized fluorescent dye. 3-Chloro-4-fluorophenyl isothiocyanate and 1-aminopyrene can be combined to make a functionalized fluorescent dye. 3-Chloro-4-fluorophenyl isothiocyanate and 6-chrysenamine can be combined to make a functionalized fluorescent dye. 3-Chloro-4-fluorophenyl isothiocyanate and 9-aminophenanthrene can be combined to make a functionalized fluorescent dye. 3-Chloro-4-fluorophenyl isothiocyanate and 2-aminofluorene can be combined to make a functionalized fluorescent dye. 3-Chloro-4-fluorophenyl isothiocyanate and 9-aminoacridine can be combined to make a functionalized fluorescent dye. 3-Chloro-4-fluorophenyl isothiocyanate and 1,10-phenanthrolin-5-amine can be combined to make a functionalized fluorescent dye. 3-Chloro-4-fluorophenyl isothiocyanate and 9H-carbazol-2-amine (hydrochloride) can be combined to make a functionalized fluorescent dye. 3-Chloro-4-fluorophenyl isothiocyanate and 3-amino-9-ethylcarbazole can be combined to make a functionalized fluorescent dye. 2-Bromo-4-fluorophenyl isothiocyanate and 1-naphthylamine can be combined to make a functionalized fluorescent dye. 2-Bromo-4-fluorophenyl isothiocyanate and 2-aminoanthracene can be combined to make a functionalized fluorescent dye. 2-Bromo-4-fluorophenyl isothiocyanate and 1-aminopyrene can be combined to make a functionalized fluorescent dye. 2-Bromo-4-fluorophenyl isothiocyanate and 6-chrysenamine can be combined to make a functionalized fluorescent dye. 2-Bromo-4-fluorophenyl isothiocyanate and 9-aminophenanthrene can be combined to make a functionalized fluorescent dye. 2-Bromo-4-fluorophenyl isothiocyanate and 2-aminofluorene can be combined to make a functionalized fluorescent dye. 2-Bromo-4-fluorophenyl isothiocyanate and 9-aminoacridine can be combined to make a functionalized fluorescent dye. 2-Bromo-4-fluorophenyl isothiocyanate and 1,10-phenanthrolin-5-amine can be combined to make a functionalized fluorescent dye. 2-Bromo-4-fluorophenyl isothiocyanate and 9H-carbazol-2-amine (hydrochloride) can be combined to make a functionalized fluorescent dye. 2-Bromo-4-fluorophenyl isothiocyanate and 3-amino-9-ethylcarbazole can be combined to make a functionalized fluorescent dye. 4-Bromo-2-chlorophenyl isothiocyanate and 1-naphthylamine can be combined to make a functionalized fluorescent dye. 4-Bromo-2-chlorophenyl isothiocyanate and 2-aminoanthracene can be combined to make a functionalized fluorescent dye. 4-Bromo-2-chlorophenyl isothiocyanate and 1-aminopyrene can be combined to make a functionalized fluorescent dye. 4-Bromo-2-chlorophenyl isothiocyanate and 6-chrysenamine can be combined to make a functionalized fluorescent dye. 4-Bromo-2-chlorophenyl isothiocyanate and 9-aminophenanthrene can be combined to make a functionalized fluorescent dye. 4-Bromo-2-chlorophenyl isothiocyanate and 2-aminofluorene can be combined to make a functionalized fluorescent dye. 4-Bromo-2-chlorophenyl isothiocyanate and 9-aminoacridine can be combined to make a functionalized fluorescent dye. 4-Bromo-2-chlorophenyl isothiocyanate and 1,10-phenanthrolin-5-amine can be combined to make a functionalized fluorescent dye. 4-Bromo-2-chlorophenyl isothiocyanate and 9H-carbazol-2-amine (hydrochloride) can be combined to make a functionalized fluorescent dye. 4-Bromo-2-chlorophenyl isothiocyanate and 3-amino-9-ethylcarbazole can be combined to make a functionalized fluorescent dye.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any subcombination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

The term "downhole" as used in this disclosure refers to under the surface of the earth, such as a location within or fluidly connected to a wellbore.

As used in this disclosure, the term "drilling fluid" refers to fluids, slurries, or muds used in drilling operations downhole, such as during the formation of the wellbore.

As used in this disclosure, the term "fluid" refers to gases, liquids, gels, and any combination of these, unless otherwise indicated.

As used in this disclosure, the term "subterranean material" or "subterranean zone" or "subterranean formation" refers to any material under the surface of the earth, including under the surface of the bottom of the ocean. For example, a subterranean zone or material can be any section of a wellbore and any section of a subterranean petroleum- or water-producing formation or region in fluid contact with the wellbore. Placing a material in a subterranean zone can include contacting the material with any section of a wellbore or with any subterranean region in fluid contact the material. Subterranean materials can include any materials placed into the wellbore such as cement, drill shafts, liners, tubing, casing, or screens; placing a material in a subterranean zone can include contacting with such subterranean materials. In some examples, a subterranean zone or material can be any downhole region that can produce liquid and/or gaseous petroleum materials, water, or any downhole section in fluid contact with liquid or gaseous petroleum materials, or water. For example, a subterranean zone or material can be at least one of an area desired to be fractured, a fracture or an area surrounding a fracture, and a flow pathway or an area surrounding a flow pathway, in which a fracture or a flow pathway can be optionally fluidly connected to a subterranean petroleum- or water-producing region, directly or through one or more fractures or flow pathways.

As used in this disclosure, "treatment of a subterranean zone" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, aquifer remediation, identifying oil rich regions via imaging techniques, and the like.

As used in this disclosure, a "flow pathway" downhole can include any suitable subterranean flow pathway through which two subterranean locations are in fluid connection. The flow pathway can be sufficient for petroleum and/or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some implementations, a flow pathway can be a water source and can include water. In some implementations, a flow pathway can be a petroleum source and can include petroleum. In some implementations, a flow pathway can be sufficient to divert water, a downhole fluid, or a produced hydrocarbon from a wellbore, fracture, or flow pathway connected to the pathway.

As used in this disclosure, "weight percent" (wt. %) can be considered a mass fraction or a mass ratio of a substance to the total mixture or composition. Weight percent can be a weight-to-weight ratio or mass-to-mass ratio, unless indicated otherwise.

As used in this disclosure, the abbreviation "MW" refers to molecular weight in daltons.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A composition comprising:
a functionalized fluorescent dye, wherein the functionalized fluorescent dye comprises an isothiocyanate-containing compound functionalized with a functional group comprising a primary amine, wherein:
the isothiocyanate-containing compound is ethyl isothiocyanate, and the functional group is 1-aminofluorene; or
the isothiocyanate-containing compound is decyl isothiocyanate, and the functional group is 9-aminoacridine.

2. The composition of claim 1, wherein the isothiocyanate-containing compound is ethyl isothiocyanate, and the functional group is 1-aminofluorene.

3. The composition of claim 1, wherein the isothiocyanate-containing compound is decyl isothiocyanate, and the functional group is 9-aminoacridine.

* * * * *